(12) United States Patent
Hiraoka

(10) Patent No.: US 9,068,094 B2
(45) Date of Patent: Jun. 30, 2015

(54) PHOTOPOLYMERIZABLE INKJET INK, INK CARTRIDGE, AND PRINTER

(75) Inventor: Takao Hiraoka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/118,405

(22) PCT Filed: May 10, 2012

(86) PCT No.: PCT/JP2012/062573
§ 371 (c)(1),
(2), (4) Date: Nov. 18, 2013

(87) PCT Pub. No.: WO2012/157690
PCT Pub. Date: Nov. 22, 2012

(65) Prior Publication Data
US 2014/0125744 A1 May 8, 2014

(30) Foreign Application Priority Data
May 18, 2011 (JP) ................. 2011-111757

(51) Int. Cl.
*B41J 2/175* (2006.01)
*C09D 11/38* (2014.01)
*B41J 11/00* (2006.01)
(Continued)

(52) U.S. Cl.
CPC ............. *C09D 11/38* (2013.01); *B41J 11/0015* (2013.01); *B41J 2/17503* (2013.01); *B41J 2/2107* (2013.01); *C09D 11/101* (2013.01)

(58) Field of Classification Search
CPC .............. B41J 2/01; B41J 2/21; B41J 2/2107; B41J 2/17503; B41J 11/0015; C09D 11/00; C09D 11/02; C09D 11/30; C09D 11/322; C09D 11/38; C09D 11/40; C09D 11/101
USPC ................ 347/85, 86, 95–105; 523/160, 161; 106/31.13, 31.6, 31.77, 31.88, 31.85
See application file for complete search history.

(56) References Cited

U.S. PATENT DOCUMENTS

| | | |
|---|---|---|
| 2004/0010052 A1 | 1/2004 | Ishizuka et al. |
| 2005/0191439 A1 | 9/2005 | Hirose et al. |
| 2006/0054040 A1 | 3/2006 | Daems et al. |

(Continued)

FOREIGN PATENT DOCUMENTS

| | | |
|---|---|---|
| CN | 101130648 A | 2/2008 |
| EP | 1 514 680 | 3/2005 |

(Continued)

OTHER PUBLICATIONS

International Search Report Issued Jun. 26, 2012 in PCT/JP2012/062573 Filed May 10, 2012.

(Continued)

*Primary Examiner* — Matthew Luu
*Assistant Examiner* — Rut Patel
(74) *Attorney, Agent, or Firm* — Oblon, McClelland, Maier & Neustadt, L.L.P.

(57) ABSTRACT

A photopolymerizable inkjet ink including: a photopolymerizable monomer having a Stimulation Index (SI value) of less than 3, where the Stimulation Index indicates the extent of sensitization as measured by a skin sensitization test based on Local Lymph Node Assay; and a phenol aromatic compound having two hydroxyl groups in the molecule thereof.

18 Claims, 2 Drawing Sheets

(51) Int. Cl.
*B41J 2/21* (2006.01)
*C09D 11/101* (2014.01)

(56) References Cited

U.S. PATENT DOCUMENTS

| | | | |
|---|---|---|---|
| 2007/0115327 | A1 | 5/2007 | Nakamura |
| 2007/0197685 | A1* | 8/2007 | Aruga et al. ............... 523/160 |
| 2008/0098928 | A1* | 5/2008 | Oyanagi et al. ............ 106/31.13 |
| 2008/0108760 | A1 | 5/2008 | Mano et al. |
| 2008/0213518 | A1* | 9/2008 | Oyanagi et al. ............. 428/34.1 |
| 2009/0099277 | A1 | 4/2009 | Nagvekar et al. |
| 2009/0118388 | A1* | 5/2009 | Naruse et al. ................ 522/39 |
| 2012/0147103 | A1 | 6/2012 | Hasegawa et al. |
| 2012/0176456 | A1 | 7/2012 | Maekawa et al. |
| 2012/0200648 | A1 | 8/2012 | Hiraoka et al. |
| 2012/0242768 | A1 | 9/2012 | Seno et al. |

FOREIGN PATENT DOCUMENTS

| | | |
|---|---|---|
| EP | 1 637 926 | 3/2006 |
| EP | 1 762 600 | 3/2007 |
| JP | 03-243670 | 10/1991 |
| JP | 04-164975 | 6/1992 |
| JP | 2003-192943 | 7/2003 |
| JP | 2003-192944 | 7/2003 |
| JP | 2005-162882 | 6/2005 |
| JP | 2005-178330 | 7/2005 |
| JP | 2005-290035 | 10/2005 |
| JP | 2006-274052 | 10/2006 |
| JP | 2006-282877 | 10/2006 |
| JP | 2006-348248 | 12/2006 |
| JP | 2007-138118 | 6/2007 |
| JP | 2009-120628 | 6/2009 |
| JP | 2010-006933 | 1/2010 |
| JP | 2010-024290 | 2/2010 |
| JP | 2010-214868 | 9/2010 |

OTHER PUBLICATIONS

U.S. Appl. No. 13/243,676, filed Sep. 23, 2011.
Combined Chinese Office Action and Search Report issued Aug. 11, 2014 in Patent Application No. 201280024150.5 (with English language translation).
Office Action in European Application No. 12786152.4, dated Apr. 2, 2015.

* cited by examiner

PHOTOPOLYMERIZABLE INKJET INK, INK CARTRIDGE, AND PRINTER

TECHNICAL FIELD

The present invention relates to a photopolymerizable inkjet ink, an ink cartridge which houses the ink, and a printer to which the ink cartridge is mounted.

BACKGROUND ART

Photopolymerizable monomers used in photopolymerizable inkjet inks are, for example, (meth)acrylic acid ester compounds, acryl amide compounds, cation polymerizable oxetane compounds and epoxy compounds. Among them, preferred are (meth)acrylic acid ester compounds and acryl amide compounds since they are available in large amounts, inexpensive, easily procurable, and capable of being used in combination with a radical polymerizable photopolymerization initiator that is inexpensive and commonly used among polymerization initiators.

However, many of (meth)acrylic acid ester compounds and acryl amide compounds have toxicity. Although some of them are relatively mild in oral toxicity and skin irritation, those with low viscosity used in inkjet inks are not safe materials in skin sensitization where they come into contact with the skin to cause allergy.

The present inventor conducted extensive studies and previously found some materials safe in skin sensitization. As a result of further studies, the present inventor previously found that there were some (meth)acrylic acid ester compounds and acryl amide compounds usable as photopolymerizable monomers and having a Stimulation Index (SI value) of less than 3 where the Stimulation Index indicates the extent of sensitization as measured by a skin sensitization test based on the LLNA (Local Lymph Node Assay). However, when those compounds are formulated so as to attain practically usable curing property, the curing property of the resultant inks becomes inferior to those of commonly used photopolymerizable inkjet inks. Thus, a photoradical polymerization initiator has to be incorporated in a larger amount than usual. Such a large amount of the photoradical polymerization initiator incorporated was found to prevent the resultant inks from showing sufficient storage stability in high-temperature environments such as summer.

Also, the present inventor previously found a photopolymerizable inkjet ink which is negative for skin sensitization, improves the coated film in curing property, enables possible curing failures in the coated film to be visually confirmed, and facilitates quality control in the production process. Specifically, the photopolymerizable inkjet ink contains: one or more types of photopolymerizable monomers each having a SI value of less than 3; a self-cleaving photopolymerization initiator; a hydrogen-abstracting polymerization initiator; and an amine compound serving as a polymerization accelerator. However, even this photopolymerizable inkjet ink is difficult to attain sufficient storage stability as described above.

As has widely been known, the storage stability of the photopolymerizable inkjet ink can be improved by the addition of a material called a polymerization inhibitor. Examples of known useful polymerization inhibitors include phenol compounds and quinone compounds such as methoquinone and benzoquinone, and aromatic secondary amine compounds such as diphenyl amine and phenothiazine (see, for example, PTLs 1 and 2).

However, even when such a known polymerization inhibitor as methoquinone is added to the above newly found compound, it is not possible to prevent the resultant inks from thickening or solidification resulting from polymerization. In addition, it was found that aromatic secondary amine compounds such as phenothiazine cannot be used due to their considerable coloring properties, although they have higher polymerization inhibiting effects Furthermore, many of the photopolymerizable monomers having a SI value of less than 3 have high viscosity as inkjet inks, and the addition of a polymerization initiator increases the inks in viscosity. Thus, it is important to take proper measures to reduce the inks in viscosity. Here, it is easy to reduce their viscosity by incorporating a diluent solvent thereinto. However, use of the diluent solvent is not desirable since it volatizes to be released to the air to give adverse effects to the environment. Therefore, the incorporation of a solvent into inks should be avoided. Alternatively, water may be incorporated into inks containing water-soluble monomers to reduce their viscosity. In this case, when non-permeable base materials such as plastic materials are used, it may not possible to obtain the effect that water penetrates into the non-permeable base materials to lead to drying. Thus, in an attempt to attain high-speed printing process, it is necessary to volatize water instantly for drying. In order to do so, a heat source must be provided in many cases, which is not preferred in terms of energy saving.

CITATION LIST

Patent Literature

PTL 1: Japanese Patent Application Laid-Open (JP-A) No. 04-164975
PTL 2: JP-A No. 2005-290035

SUMMARY OF INVENTION

Technical Problem

An object of the present invention is to provide a photopolymerizable inkjet ink that is safe in skin sensitization and good in storage stability at high temperatures.

Solution to Problem

Means for solving the problems are as follows. Specifically, a photopolymerizable inkjet ink of the present invention contains: a photopolymerizable monomer having a Stimulation Index (SI value) of less than 3, where the Stimulation Index indicates the extent of sensitization as measured by a skin sensitization test (LLNA); and a phenol aromatic compound having two hydroxyl groups in the molecule thereof.

Advantageous Effects of Invention

The present invention can provide a photopolymerizable inkjet ink that is safe in skin sensitization and good in storage stability at high temperatures.

DESCRIPTION OF EMBODIMENTS (Photopolymerizable Inkjet Ink)

Figure 1:
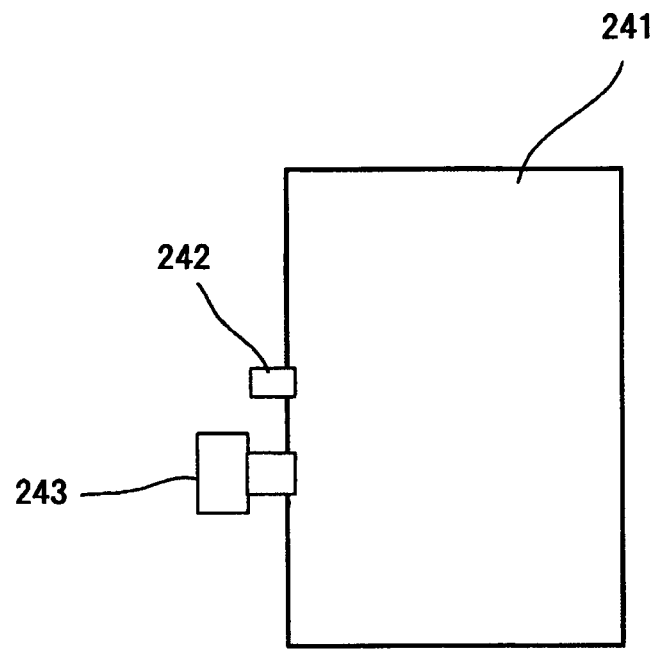
FIG. 1 schematically illustrates one exemplary ink bag of an ink cartridge.

A photopolymerizable inkjet ink of the present invention contains: a photopolymerizable monomer having a Stimulation Index (SI value) of less than 3, where the Stimulation Index indicates the extent of sensitization as measured by a skin sensitization test (LLNA); and a phenol aromatic compound having two hydroxyl groups in the molecule thereof. The photopolymerizable inkjet ink preferably contains at least one selected from the group consisting of a photopolymerization initiator and an amine compound serving as a polymerization accelerator; and, if necessary, further contains other ingredients.

The present inventor has found that by incorporating the phenol aromatic compound having two hydroxyl groups in the molecule thereof into a photopolymerizable inkjet ink (hereinafter may be referred to as "ink") containing a safe photopolymerizable monomer having a SI value of less than 3 where the SI value indicates the extent of sensitivity as measured by the skin sensitization test (LLNA), the resultant ink can show good storage stability even at high temperatures.

Notably, the "LLNA" is the skin sensitization test defined as OECD test guideline 429. As described in literatures (for example, "Functional Material" (Kino Zairyou) 2005, September, Vol. 25, No. 9, p. 55), the compound having a Stimulation Index (SI value) of less than 3, where the Stimulation Index indicates the extent of skin sensitization, is judged as being negative for skin sensitization. Also, the compounds evaluated as "negative for skin sensitization" or "no skin sensitization" in their MSDS (Material Safety Data Sheet) and/or literatures (for example, van der Walle HB. et al., Contact Dermatitis, 1982, 8(4), 223-235) each have the above SI value which is less than 3, and therefore they are encompassed by the present invention. The lower SI value means lower skin sensitization. Thus, in the present invention, a monomer or an oligomer having lower SI value is preferably used. The SI value of the monomer or the oligomer used is preferably 2 or lower, more preferably 1.6 or lower.

<Phenol Aromatic Compound having Two Hydroxyl Groups in the Molecule Thereof>

The phenol aromatic compound having two hydroxyl groups in the molecule thereof is not particularly limited and may be appropriately selected depending on the intended purpose. Examples thereof include hydroquinone, methylhydroquinone, tert-butylhydroquinone, 2,5-di-tert-butylhydroquinone, 2,2'-methylenebis(4-methyl-6-tert-butylphenol), 2,2'-methylenebis(4-ethyl-6-tert-butylphenol) and 2,2'-methylenebis[6-(1-methylcyclohexyl-p-cresol)]. These may be used alone or in combination.

Among them, hydroquinone, methylhydroquinone, tert-butylhydroquinone and 2,5-di-tert-butylhydroquinone are preferred since they are particularly excellent in storage stability at high temperatures.

A proper amount of the phenol aromatic compound having two hydroxyl groups in the molecule thereof varies with properties required for inks depending on their applications. When the amount of the phenol aromatic compound having two hydroxyl groups in the molecule thereof is too small, satisfactory effects cannot be obtained in some cases, whereas when it is too large, the curing property of the resultant ink may be degraded. Thus, the amount of the phenol aromatic compound having two hydroxyl groups in the molecule thereof contained in the ink is preferably 0.001 parts by mass to 1 part by mass per 100 parts by mass of the photopolymerizable monomer. However, the amount of the phenol aromatic compound having two hydroxyl groups in the molecule thereof is necessarily limited to this range. In particular, considering a generally known mechanism of showing storage stability in which the phenol aromatic compound having hydroxyl groups in the molecule thereof traps radicals generated in inks to form stable radicals, the amount of the phenol aromatic compound having two hydroxyl groups in the molecule thereof is preferably larger for improving storage stability. However, a larger amount of the phenol aromatic compound having two hydroxyl groups in the molecule thereof is not preferred for obtaining sufficient curing property. Therefore, the amount of the phenol aromatic compound having two hydroxyl groups in the molecule thereof should appropriately be determined considering required curing property.

<Photopolymerizable Monomer>

The photopolymerizable monomer involving no problems in skin sensitization, inexpensive and easily procurable is not particularly limited and may be appropriately selected depending on the intended purpose. Examples thereof include polyethylene glycol dimethacrylates represented by the following General Formula (1) where n is nearly equal to 2, 9 or 14, γ-butyrolactone methacrylate, trimethylolpropane trimethacrylate, tricyclodecanedimethanol dimethacrylate, caprolactone-modified dipentaerythritol hexaacrylate, polypropylene glycol diacrylate [$CH_2=CH-CO-(OC_3H_6)_n-OCOCH=CH_2$ (n is nearly equal to 12)], diacrylates of caprolactone-modified neopentylglycol hydroxypivalate, polyethoxylated tetramethylol methane tetraacrylate, ethylene oxide-modified bisphenol A diacrylate, neopentyl glycol dimethacrylate, stearyl acrylate, 1,4-butanediol dimethacrylate, hydroxyethyl acrylamide, acryloylmorpholine, t-butyl methacrylate, n-pentyl methacrylate, n-hexyl methacrylate, ethylene oxide-modified phenol acrylate, isostearyl acrylate, ethylene oxide-modified trimethylolpropane trimethacrylate, stearyl methacrylate, glycerin dimethacrylate, triethylene glycol divinyl ether and isobutyl divinyl ether. These may be used alone or in combination.

Among them, preferred are polyethylene glycol dimethacrylates represented by the following General Formula (1) where n is nearly equal to 2, 9 or 14, γ-butyrolactone methacrylate, trimethylolpropane trimethacrylate, tricyclodecanedimethanol dimethacrylate, caprolactone-modified dipentaerythritol hexaacrylate, polypropylene glycol diacrylate [$CH_2=CH-CO-(OC_3H_6)_n-OCOCH=CH_2$ (n is nearly equal to 12)], diacrylates of caprolactone-modified neopentylglycol hydroxypivalate, polyethoxylated tetramethylol methane tetraacrylate, ethylene oxide-modified bisphenol A diacrylate, neopentyl glycol dimethacrylate, steary acrylate, 1,4-butanediol dimethacrylate, hydroxyethyl acrylamide, t-butyl methacrylate, n-pentyl methacrylate, n-hexyl methacrylate, ethylene oxide-modified phenol acrylate, isostearyl acrylate, ethylene oxide-modified trimethylolpropane trimethacrylate, stearyl methacrylate and glycerin dimethacrylate, since they are excellent in storage stability at high temperatures.

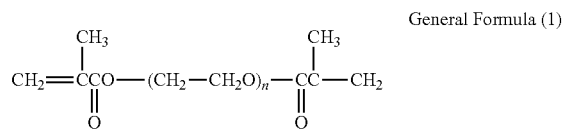

General Formula (1)

In General Formula (1), n is nearly equal to 2, 9 or 14.

Notably, when using a mixture containing two or more polyethylene glycol dimethacrylates each represented by General Formula (1), the average of the numbers indicated by "n," which are calculated through analysis such as measurement of their molecular weights, preferably falls within the range of 9 to 14.

Also, other (meth)acrylates, (meth)acryl amides and compounds may be used in combination, so long as the amount of them falls within such a range that does not raise any problems as inks even if they somewhat cause problems in skin sensitization when used alone or they have not been confirmed for skin sensitization.

Examples thereof include ethylene glycol di(meth)acrylate, neopentylglycol hydroxypivalate di(meth)acrylate, γ-butyrolactone acrylate, isobornyl acrylate, formalized trimethylolpropane mono(meth)acrylate, polytetramethylene glycol di(meth)acrylate, trimethylolpropane (meth)acrylate benzoate, diethylene glycol diacrylate, triethylene glycol di(meth)acrylate, tetraethylene glycol di(meth)acrylate, polyethylene glycol diacrylates [$CH_2$=CH—CO—($OC_2H_4$)$_n$—OCOCH=$CH_2$ where n is nearly equal to 4], [$CH_2$=CH—CO—($OC_2H_4$)$_n$—OCOCH=$CH_2$ where n is nearly equal to 9], [$CH_2$=CH—CO—($OC_2H_4$)$_n$—OCOCH=$CH_2$ where n is nearly equal to 14], and [$CH_2$=CH—CO—($OC_2H_4$)$_n$—OCOCH=$CH_2$ where n is nearly equal to 23], dipropylene glycol di(meth)acrylate, tripropylene glycol di(meth)acrylate, polypropylene glycol dimethacrylate [$CH_2$=C($CH_3$)—CO—($OC_3H_6$)$_n$—OCOC($CH_3$)=$CH_2$ where n is nearly equal to 7)], 1,3-butandiol diacrylate, 1,4-butandiol diacrylate, 1,6-hexanediol di(meth)acrylate, 1,9-nonanediol di(meth)acrylate, neopentyl glycol di(meth)acrylate, tricyclodecanedimethanol diacrylate, di(meth)acrylate of bisphenol A propylene oxide adduct, polyethylene glycol di(meth)acrylate, dipentaerythritol hexa(meth)acrylate, methacryloyl morpholine, 2-hydroxypropyl methacrylamide, ethylene oxide-modified tetramethylolmethane tetramethacrylate, dipentaerythritol hydroxypenta(meth)acrylate, caprolactone-modified dipentaerythritol hydroxypenta(meth)acrylate, ditrimethylolpropane tetra(meth)acrylate, pentaerythritol tetra(meth)acrylate, trimethylolpropane triacrylate, ethylene oxide-modified trimethylolpropane triacrylate, propylene oxide-modified trimethylolpropane triacrylate, caprolactone-modified trimethylolpropane tri(meth)acrylate, pentaerythritol tri(meth)acrylate, tris(2-hydroxyethyl)isocyanurate tri(meth)acrylate, neopentyl glycol diacrylate, ethoxylated neopentyl glycol di(meth)acrylate, propoxylated neopentyl glycol di(meth)acrylate, propoxylated glyceryl tri(meth)acrylate, polyester di(meth)acrylate, polyester tri(meth)acrylate, polyester tetra(meth)acrylate, polyester penta(meth)acrylate, polyester poly(meth)acrylate, vinylcaprolactam, vinylpyrrolidone, N-vinylformamide, polyurethane di(meth)acrylate, polyurethane tri(meth)acrylate, polyurethane tetra(meth)acrylate, polyurethane penta(meth)acrylate, polyurethane poly(meth)acrylate, N-dimethylaminoethyl acrylamide, N-isopropyl acrylamide, N-dimethyl acrylamide, N-diethyl acrylamide and N-dimethylaminopropyl acrylamide.

The amount of these photopolymerizable monomers contained in the ink is not particularly limited and may be appropriately selected depending on the intended purpose. It is preferably 50% by mass to 100% by mass, more preferably 80% by mass to 100% by mass. Although incorporating a colorant and other additives into the ink can provide the ink with various functions, the polymerization reaction of the monomers may be inhibited depending on the amount thereof. Thus, it is not preferred to incorporate an unnecessarily excessive amount of a colorant and other additives.

<Photopolymerization Initiator>

The ink may further contain a photopolymerization initiator. The photopolymerization initiator is preferably a self-cleaving photopolymerization initiator or a hydrogen-abstracting photopolymerization initiator. The photopolymerization initiator used is preferably negative for skin sensitization similar to the photopolymerizable monomers. Also, the following compounds, which somewhat sensitize the skin when used alone or which have not been confirmed for skin sensitization, would be used so long as the amount of them falls within such a range that does not raise any problems as inks.

—Self-cleaving Photopolymerization Initiator—

The self-cleaving photopolymerization initiator is not particularly limited and may be appropriately selected depending on the intended purpose. Examples thereof include 2,2-dimethoxy-1,2-diphenylethan-1-one, 1-hydroxycyclohexyl phenyl ketone, 2-hydroxy-2-methyl-1-phenylpropan-1-one, 1-[4-(2-hydroxyethoxyl)-phenyl]-2-hydroxy-2-methyl-1-propan-1-one, 2-hydroxy-1-{4-[4-(2-hydroxy-2-methylpropionyl)benzyl]phenyl}-2-methyl-1-propan-1-one, phenylglyoxylic acid methyl ester, 2-methyl-1-[4-(methylthio)phenyl]-2-morpholinopropan-1-one, 2-benzyl-2-dimethylamino-1-(4-morpholinophenyl)butanone-1,2-dimethyl amino-2-(4-methyl-benzyl)-1-(4-morpholin-4-yl-phenyl)butan-1-one, bis(2,4,6-trimethylbenzoylphenylphosphine oxide, bis(2,6-dimethoxybenzolyl)-2,4,4-trimethyl-pentylphosphine oxide, 2,4,6-trimethylbenzoylphosphine oxide, 1,2-octanedion-[4-(phenylthio)-2-(o-benzoyloxime)], ethanone-1-[9-ethyl-6-(2-methylbenzoyl)-9H-carbazol-3-yl]-1-(O-acetyloxime) and [4-(methylphenylthio)phenyl]phenylmethanone. These may be used alone or in combination.

In particular, 2-dimethylamino-2-(4-methylbenzyl)-1-(4-morpholin-4-yl-phenyl)-butan-1-one is preferred since it exhibits good curing performance. Also, 2-methyl-1-[4-(methylthio)phenyl]-2-morpholinopropan-1-one is preferred since it is inexpensive.

—Hydrogen-abstracting Photopolymerization Initiator—

The hydrogen-abstracting photopolymerization initiator is not particularly limited and may be appropriately selected depending on the intended purpose. Examples thereof include: thioxanthone compounds such as 2,4-diethylthioxanthone, 2-chlorothioxanthone, isopropylthioxanthone and 1-chloro-4-propylthioxanthone; and benzophenone compounds such as benzophenone, methylbenzophenone, methyl-2-benzoylbenzoate, 4-benzoyl-4'-methyldiphenyl sulfide and phenylbenzophenone. These may be used alone or in combination.

With the increased requirements for awareness to environmental protection, the recent interest has focused on LED light sources as light sources for curing photopolymerizable inks since the LED light sources exhibit higher energy efficiency than conventional mercury lamps and metal halide lamps and realize energy saving. However, the wavelength of the LED light sources free from practical problems is 365 nm or greater. Thus, when the current LED light sources are used, it is difficult to expect benzophenone compounds to satisfactorily serve as an initiator, judging from their specific absorption spectra. For this reason, thioxanthone compounds are more suitable. Among them, chlorine-free 2,4-diethylthioxanthone and isopropylthioxanthone are preferred from the viewpoint of environmental protection.

<Polymerization Accelerator>

The polymerization accelerator is not particularly limited, so long as it is an amine compound, and may be appropriately selected depending on the intended purpose. Examples thereof include benzoic acid ester compounds containing an N,N-dimethylamino group, such as ethyl p-dimethylaminobenzoate, 2-ethylhexyl p-dimethylaminobenzoate, methyl p-dimethylaminobenzoate, 2-dimethylaminoethyl benzoate and butoxyethyl p-dimethylaminobenzoate. These may be used alone or in combination.

Among them, ethyl p-dimethylaminobenzoate is preferred since it is inexpensive, easily procurable and has the highest viscosity-reducing effect.

The amine compound serves as a source for supplying hydrogen to the hydrogen-abstracting photopolymerization initiator. In particular, a benzoic acid ester compound having a N,N-dimethylamino group can more efficiently accelerate the curing reaction.

When the amount of the photopolymerization initiators (the self-cleaving photopolymerization initiator and/or the hydrogen-abstracting photopolymerization initiator) and the polymerization accelerator is too small, the photopolymerization reaction hardly proceeds whereby sufficient curing cannot be attained in some cases. When it is too large, the polymerization reaction proceeds, but the polymerization degree does not increase so that the cured product may be brittle; or the photopolymerization initiator may excessively increase the viscosity of the ink to cause failures in inkjet ejection.

Therefore, the total amount of the photopolymerization initiators and the polymerization accelerator is preferably 1 part by mass to 50 parts by mass, particularly preferably 10 parts by mass to 35 parts by mass, per 100 parts by mass of the photopolymerizable monomer. When high-energy light sources such as $\alpha$ rays, $\beta$ rays, $\gamma$ rays, X rays or electron beams are used, the polymerization reaction proceeds without photopolymerization initiator or polymerization accelerator. This is a widely known matter, and these high-energy light sources have not been commonly used yet since they require high cost for their safety and for maintenance of necessary facilities. Thus, detail explanation therefor is not given here.

<Other Ingredients>

The other ingredients are not particularly limited and may be appropriately selected depending on the intended purpose. Examples thereof include colorants; higher-fatty-acid esters having, for example, a polyether, an amino group, a carboxyl group, and/or a hydroxyl group in the side chain or the end thereof; polydimethylsiloxane compounds having, for example, a polyether, an amino group, a carboxyl group, and/or a hydroxyl group in the side chain or the end thereof; surfactants such as fluoroalkyl compounds having, for example, a polyether, an amino group, a carboxyl group, and/or a hydroxyl group; and polar group-containing polymeric pigment dispersing agents. These may be used alone or in combination.

<<Colorant>>

The colorant of the ink is not particularly limited and may be appropriately selected from known inorganic pigments and organic pigments considering, for example, physical properties of the ink.

As for black pigments, those such as carbon black produced by the furnace method or the channel method can be used. These may be used alone or in combination.

As for yellow pigments, for example, the following Pig. Yellow series pigments can be used: Pig. Yellow 1, Pig. Yellow 2, Pig. Yellow 3, Pig. Yellow 12, Pig. Yellow 13, Pig. Yellow 14, Pig. Yellow 16, Pig. Yellow 17, Pig. Yellow 73, Pig. Yellow 74, Pig. Yellow 75, Pig. Yellow 83, Pig. Yellow 93, Pig. Yellow 95, Pig. Yellow 97, Pig. Yellow 98, Pig. Yellow 114, Pig. Yellow 120, Pig. Yellow 128, Pig. Yellow 129, Pig. Yellow 138, Pig. Yellow 150, Pig. Yellow 151, Pig. Yellow 154, Pig. Yellow 155, and Pig. Yellow 180. These may be used alone or in combination.

As for magenta pigments, for example, the following Pig. Red series pigments can be used: Pig. Red 5, Pig. Red 7, Pig. Red 12, Pig. Red 48 (Ca), Pig. Red 48 (Mn), Pig. Red 57 (Ca), Pig. Red 57:1, Pig. Red 112, Pig. Red 122, Pig. Red 123, Pig. Red 168, Pig. Red 184, Pig. Red 202, and Pig. Violet 19. These may be used alone or in combination.

As for cyan pigments, for example, the following Pig. Blue series pigments can be used: Pig. Blue 1, Pig. Blue 2, Pig. Blue 3, Pig. Blue 15, Pig. Blue 15:3, Pig. Blue 15:4, Pig. Blue 16, Pig. Blue 22, Pig. Blue 60, Vat Blue 4, and Vat Blue 60. These may be used alone or in combination.

As for white pigments, for example, sulfuric acid salts of alkaline earth metals such as barium sulfate, carbonic acid salts of alkaline earth metals such as calcium carbonate, silica such as fine silicic acid powder and synthetic silicic acid salts, calcium silicate, alumina, alumina hydrate, titanium oxide, zinc oxide, talc and clay. These may be used alone or in combination.

(Ink Cartridge)

An inkjet cartridge of the present invention includes at least the above-described photopolymerizable inkjet ink of the present invention.

In other words, the ink of the present invention can suitably be used as an ink cartridge where the ink is housed in a container. With this form, users do not have to directly touch the ink during works such as exchange of the ink, and thus they are not concerned with staining of their fingers, hands or clothes. In addition, it is possible to prevent interfusion of foreign matter such as dust into the ink.

The container is not particularly limited, and the shape, structure, size and material thereof may be appropriately selected depending on the intended purpose. For example, the container is preferably selected from those having an ink bag formed of an aluminum laminate film, or a resin film.

Figure 2:
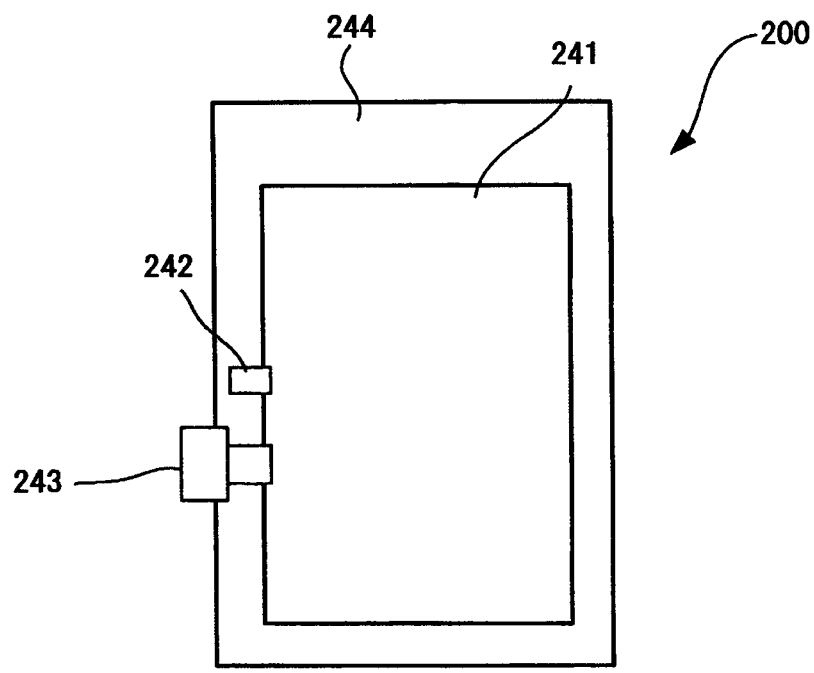
FIG. 2 schematically illustrates an ink cartridge which houses an ink bag.

The ink cartridge will be described referring to FIGS. 1 and 2. FIG. 1 schematically illustrates an example of an ink bag 241 of an ink cartridge. FIG. 2 schematically illustrates an ink cartridge 200 containing the ink bag 241 illustrated in FIG. 1 and a cartridge case 244 which houses the ink bag 241.

As illustrated in FIG. 1, the ink bag 241 is filled with the ink by injecting the ink from an ink inlet 242. After removal of air present inside the ink bag 241, the ink inlet 242 is sealed by fusion bonding. At the time of use, a needle attached to the main body of the device is inserted into an ink outlet 243 formed of a rubber member to supply the ink to the device therethrough. The ink bag 241 is formed of a wrapping member such as an air non-permeable aluminum laminate film. As illustrated in FIG. 2, the ink bag 241 is typically housed in a plastic cartridge case 244, which is then detachably mounted in use to various inkjet recording devices as the ink cartridge 200.

The ink cartridge of the present invention is preferably detachably mounted to inkjet recording devices (e.g., a printer). The ink cartridge can simplify the refill and exchange of the ink to improve workability.

(Printer)

A printer of the present invention includes at least the above-described ink cartridge of the present invention mounted thereto.

Figure 3:
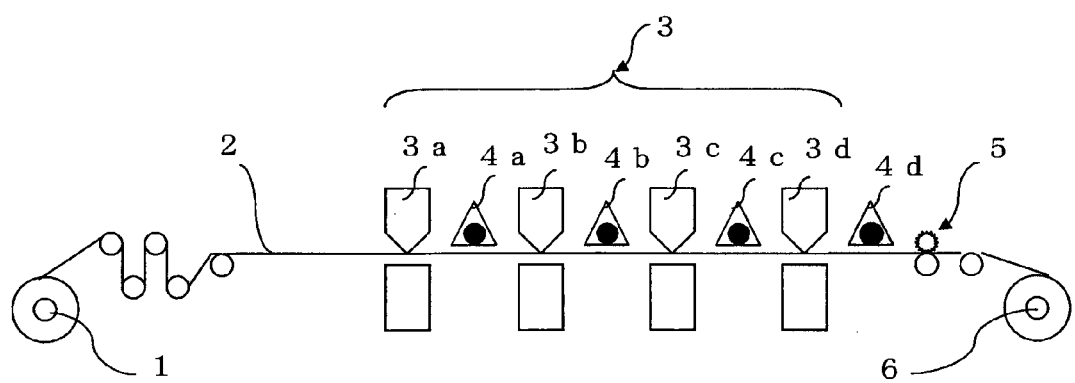
FIG. 3 schematically illustrates one exemplary printer of the present invention.

Here, FIG. 3 schematically illustrates one exemplary printer.

The printer illustrated in FIG. 3 forms a color image as follows. Specifically, printing units 3 (i.e., printing units 3a, 3b, 3c and 3d having ink cartridges 200a, 200b, 200c and 200d for respective colors (e.g., yellow, magenta, cyan and black)) eject color inks (yellow, magenta, cyan and black) on a base material to be printed 2 (which is conveyed from left to right in FIG. 3) fed from a base material feed roller 1, and light (UV rays) is applied from UV light sources (curing light sources) 4a, 4b, 4c and 4d to the corresponding color inks for curing.

The base material 2 used is, for example, paper, a film, a metal or a composite material thereof. The base material 2 illustrated in FIG. 3 is a roll but may be a sheet. In addition, the base material may be subjected to double-side printing as well as single-side printing.

When UV rays are applied to each of the color inks for every printing process, the color inks are satisfactorily cured. In order to achieve high-speed printing, the UV light sources 4a, 4b and 4c may be lowered in output power or may be omitted, so that the UV light source 4d is made to apply a sufficient dose of UV rays to a composite printed image formed of a plurality of colors. By doing so, energy saving and cost reduction can also be realized.

In FIG. 3, reference numeral 5 denotes a processing unit and reference numeral 6 denotes a wind-up roll for printed products.

EXAMPLES

The present invention will next be described in more detail by way of Examples and Comparative Examples. However, the present invention should not be construed as being limited to the Examples.

Examples 1 to 480

Mixtures of Preparation Examples 1 to 120 were prepared by mixing the following photopolymerizable monomers A1 to A23 (i.e., (meth)acrylic acid ester compounds or acrylamide compounds each being negative for skin sensitization or having a SI value of less than 3) with at least one of the following self-cleaving photopolymerization initiators B1-1 and B1-2, the following hydrogen-abstracting photopolymerization initiator B2-1 and B2-2, and the following polymerization accelerator B3 in the compositions and the amounts (parts by mass) shown in Tables 1 to 12. Then, 100 parts by mass of each of the mixtures was mixed with 0.1 parts by mass of each of the following phenol aromatic compounds C1 to C4 having two hydroxyl groups in the molecule thereof shown in Tables 13-1 to 18-2, to thereby produce inks (photopolymerizable inkjet inks) of Examples 1 to 480.

Notably, the units of the amounts of the photopolymerizable monomers, the photopolymerization initiators, and the phenol aromatic compound having two hydroxyl groups in the molecule thereof shown in Tables 1 to 12 are "parts by mass."

Comparative Examples 1 to 240

Inks of Comparative Examples 1 to 240 were produced in the same manner as in each of Examples 1 to 480, except that 0.1 parts by mass of the phenol aromatic compound C1, C2, C3 or C4 having two hydroxyl groups in the molecule thereof was changed to 0.1 parts by mass of each of the following phenol aromatic compounds C5 and C6 having one hydroxyl group in the molecule thereof as shown in Tables 13-1 to 18-2.

Notably, the units of the amounts of the photopolymerizable monomers, the photopolymerization initiators, and the phenol aromatic compound having one hydroxyl group in the molecule thereof shown in Tables 1 to 12 are "parts by mass."

The following compounds were used as A1 to A23 (photopolymerizable monomers), B1-1 to B2-2 (photopolymerization initiators), B3 (polymerization accelerator), C1 to C4 (phenol aromatic compounds having two hydroxyl groups in the molecule thereof) and C5 and C6 (phenol aromatic compounds having one hydroxyl group in the molecule thereof) shown in Tables 1 to 18-2.

The value in parentheses after each of A1 to A23 is "SI value" and the description "negative" or "none" after each of A1 to A23 means that the compound is evaluated as "negative for skin sensitization" or "no skin sensitization" in the MSDS (Material Safety Data Sheet) or literatures (for example, van der Walle HB. et al., Contact Dermatitis, 1982, 8(4), 223-235). The description "negative" or "none" is equivalent to the SI value of less than 3.

[Photopolymerizable Monomers]

A1: Neopentyl glycol dimethacrylate (2.0) ("NPG," product of Shin-Nakamura Chemical Co., Ltd.)

A2: Polyethylene glycol dimethacrylate represented by the following General Formula (1) (n is nearly equal to 9) (1.3) ("LIGHT ESTER 9EG," product of KYOEISHA CHEMICAL CO., LTD.)

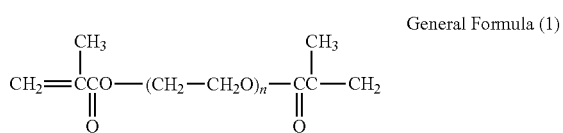

General Formula (1)

A3: Polyethylene glycol dimethacrylate represented by General Formula (1) (n is nearly equal to 14) (1.6) ("LIGHT ESTER 14EG," product of KYOEISHA CHEMICAL CO., LTD.)

A4: γ-Butyrolactone methacrylate (2.1) ("GBLMA," product of OSAKA ORGANIC CHEMICAL INDUSTRY, LTD.)

A5: Trimethylolpropane trimethacrylate (1.9) ("SR350," product of Sartomer Co.)

A6: Tricyclodecanedimethanol dimethacrylate (1.3) ("DCP," product of Shin-Nakamura Chemical Co., Ltd.)

A7: Caprolactone-modified dipentaerythritol hexaacrylate ("negative" evaluated in MSDS) ("DPCA60," product of NIPPON KAYAKU Co. Ltd.)

A8: Caprolactone-modified neopentylglycol hydroxypivalate diacrylate (0.9) ("HX620," product of NIPPON KAYAKU Co. Ltd.)

A9: Polyethoxylated tetramethylolmethane tetraacrylate (1.7) ("ATM35E," product of Shin-Nakamura Chemical Co., Ltd.)

A10: Ethylene oxide-modified bisphenol A diacrylate (1.2) ("BPE10," product of DAI-ICHI KOGYO SEIYAKU CO., LTD.)

A11: Hydroxyethylacryl amide ("none": MSDS) ("HEAA," product of KOHJIN Co., Ltd.)

A12: Stearyl acrylate (2.7) ("STA," product of OSAKA ORGANIC CHEMICAL INDUSTRY, LTD.)

A13: 1,4-Butanediol dimethacrylate (2.6) ("SR214," product of Sartomer Co.)

A14: Polypropylene glycol diacrylate [$CH_2$=CH—CO—($OC_3H_6$)$_n$—OCOCH=$CH_2$ (n is nearly equal to 12)] (1.5) ("M-270," product of Toagosei Chemical CO., LTD.)

A15: t-Butyl methacrylate ("negative": literature) ("LIGHT ESTER TB" product of KYOEISHA CHEMICAL CO., LTD.)

A16: n-Pentyl methacrylate ("negative": literature) ("n-AMYL METHACRYLATE," product of Toyo Science Corp.)

A17: n-Hexyl methacrylate ("negative": literature) ("n-HEXYL METHACRYLATE," product of TOKYO CHEMICAL INDUSTRY CO., LTD.)
A18: Ethylene oxide-modified phenol acrylate (0.7) ("M102," product of Toagosei Chemical CO., LTD.)
A19: Isostearyl acrylate (1.4) ("S1800A," product of Shin-Nakamura Chemical Co., Ltd.)
A20: Ethylene oxide-modified trimethylol propane trimethacrylate (1.0) ("TMPT3EO," product of Shin-Nakamura Chemical Co., Ltd.)
A21: Stearyl methacrylate (1.2) ("S," product of Shin-Nakamura Chemical Co., Ltd.)
A22: Glycerin dimethacrylate (1.2) ("701," product of Shin-Nakamura Chemical Co., Ltd.)
A23: Polyethylene glycol dimethacrylate represented by General Formula (1) (n is nearly equal to 2) (1.1) ("2G," product of Shin-Nakamura Chemical Co., Ltd.)
[Self-cleaving Photopolymerization Initiators]
B1-1: 2-Methyl 1-[4-(methylthio)phenyl]-2-morpholinopropan-1-one ("Irgacure907," product of BASF Co.)
B1-2: 2-Dimethylamino-2-(4-methylbenzyl)-1-(4-morpholin-4-yl-phenyl)-butan-1-one ("Irgacure379," product of BASF Co.)
[Hydrogen-Abstracting Photopolymerization Initiators]
B2-1: 2,4-Diethylthioxanthone ("DETX-S," product of NIPPON KAYAKU Co. Ltd.)
B2-2: Isopropylthioxanthone ("Esacure ITX," product of Lamberti Co.) [Polymerization accelerator]
B3: Ethyl p-dimethylaminobenzoate ("Darocur EDB," product of Ciba Specialty Chemicals K.K.)
[Phenol Aromatic Compound Having Two Hydroxyl Groups in the Molecule Thereof]
C1: Hydroquinone ("HYDROQUINONE," product of Seiko Chemical Co., Ltd.)
C2: Methylhydroquinone ("MH," product of Seiko Chemical Co., Ltd.)
C3: tert-Butylhydroquinone ("TBH," product of Seiko Chemical Co., Ltd.)
C4: 2,5-Di-tert-butylhydroquinone ("NONFLEX ALBA," product of Seiko Chemical Co., Ltd.)
[Phenol Aromatic Compound Having One Hydroxyl Group in the Molecule Thereof]
C5: Methoquinone ("METHOQUINONE," product of Seiko Chemical Co., Ltd.)
C6: 4-Methoxy-1-naphthol ("MNT," product of KAWASAKI KASEI CHEMICALS LTD.)

Each of the inks of Examples 1 to 480 and Comparative Examples 1 to 240 was placed in a container, which was then hermetically sealed in the dark and left to stand at 70° C. for 1 week. In the below-described manner, the ink was evaluated for "rate of change in viscosity at 60° C." and "inkjetting property." Notably, since evaluating the storage stability of an ink at ordinary temperature requires considerably long-term observation and complicated evaluation process, the inks were subjected to the acceleration test at 70° C.

In addition, the mixtures of Preparation Examples 1 to 120 and the inks of Examples 1 to 480 and Comparative Examples 1 to 240 were subjected to "measurement of curing light dose" and "observation of the appearance of cured and uncured coated films" in the below-described manner.

<Rate of Change in Viscosity at 60° C.>

Before and after subjected to the acceleration test, each of the inks of Examples 1 to 480 and Comparative Examples 1 to 240 was measured for viscosity at 60° C. (mPa·S) and the obtained value was used to calculate the rate of change (%) in viscosity at 60° C. from the following equation.

The viscosity at 60° C. was measured with a cone-plate-type rotary viscometer (TV-22L, product of TOKI SANGYO CO., LTD.) with the temperature of circulating water being constantly set to 60° C. The temperature of 60° C. is a temperature set considering the specification of a commercially available inkjet ejection head able to be heated, such as GEN4 (product of Ricoh Printing Systems, Ltd.).

Rate of change (%)=[1−(viscosity after the acceleration test/viscosity before the acceleration test)]×100

The results are collectively shown in Tables 13-1 to 18-2. All of the inks of Comparative Examples 1 to 240 gellated after the acceleration test. Here, "gellation" described in Tables 13-1 to 18-2 means a state where part or the whole of the ink turned into a solid state after the acceleration test and the ink could not be measured for viscosity. In other words, it means that the ink had considerably bad storage stability.

In contrast, the rates of change in Examples were up to +3.2%, indicating that the inks of Examples had high storage stability at high temperatures.

<Evaluation of Inkjetting Property>

An aluminum pouch bag having a shape illustrated in FIG. 1 was charged with each of the inks of Examples 1 to 480 and Comparative Examples 1 to 240 before and after the acceleration test, and hermetically sealed so as to avoid inclusion of air bubbles. The hermetically sealed pouch bag containing the ink was housed in a plastic cartridge as illustrated in FIG. 2. This cartridge was mounted to a casing adapted for housing it. In the casing, an ink flow channel was provided from the cartridge to an inkjet head (GEN4, product of Ricoh Printing Systems, Ltd.). Then, each of the inks of Examples 1 to 480 and Comparative Examples 1 to 240 before and after the acceleration test was ejected through the ink flow channel to form a solid coated film (i.e., a uniformly and entirely coated film) on a commercially available polyethylene terephthalate film (product name: COSMOSHINE A4300, product of TOYOBO CO., LTD.) so that the solid coated film had a thickness of about 10 µm.

As a result, the inks of Examples 1 to 480 could be ejected without any particular problems both before and after the acceleration test. The solid coated films formed of the inks of Example 1 to 480 both before and after the acceleration test were cured without any problems. Specifically, by applying a light dose twice or less times of that required for curing the initial solid coated films formed of the inks of Example 1 to 480 before the acceleration test, the solid coated films formed of the inks of Example 1 to 480 after the acceleration test were cured to be in a non-sticky state which was judged by touching them with a finger.

The inks of Comparative Examples 1 to 240 partially or totally gelated after the acceleration test to lose properties as inkjet inks. Thus, these inks could not be evaluated for inkjetting property. Also, their curing properties were not evaluated since they could not form the above-described solid coated film.

<Measurement of Required Curing Light Dose for the Disappearance of Tackiness, and Observation of the Appearance of Cured and Uncured Coated Films>

Each of the mixtures of Preparation Examples 1 to 120 shown in Tables 1 to 12 was measured for required curing light dose for the disappearance of tackiness in the following manner.

An aluminum pouch bag having a shape illustrated in FIG. 1 was charged with each of the mixtures of Preparation Examples 1 to 120, and hermetically sealed so as to avoid inclusion of air bubbles. The hermetically sealed pouch bag containing the mixture was housed in a plastic cartridge as illustrated in FIG. 2. This cartridge was mounted to a casing adapted for housing it. In the casing, an ink flow channel was provided from the cartridge to an inkjet head (GEN4, product of Ricoh Printing Systems, Ltd.). Then, the mixture was ejected through the ink flow channel to form a solid coated film (i.e., a uniformly and entirely coated film) on a commercially available polyethylene terephthalate film (product name: COSMOSHINE A4300, product of TOYOBO CO., LTD.) so that the solid coated film had a thickness of about 10 μm, whereby an uncured film was formed.

The thus-formed uncured film was irradiated with light using a UV curing device (LH6, product of Fusion UV Systems Co.), with the light dose being changed stepwise to 1,000 mJ/cm$^2$, 500 mJ/cm$^2$, 300 mJ/cm$^2$, 100 mJ/cm$^2$, 50 mJ/cm$^2$, 20 mJ/cm$^2$, 10 mJ/cm$^2$ and 5 mJ/cm$^2$. After the irradiation of the above predetermined light dose, the state of the coated film was confirmed by touching it with a finger. The coated film that had lost tackiness was judged as being cured. The minimum light dose required that the coated film had been cured was used as a curing light dose required that the coated film had lost tackiness. The curing light dose required that the coated film had lost tackiness is shown as "curing light dose" in Tables 1 to 12.

In addition, the uncured coated film was irradiated with the curing light dose required that the coated film would lose tackiness to prepare a cured coated film. The above-prepared uncured and cured coated films were observed for appearance. The results are shown in Tables 1 to 12.

In the same manner, the inks of Examples 1 to 480 and Comparative Examples 1 to 240, each containing each of the mixtures of Preparation Examples 1 to 120 together with the phenol aromatic compound having two hydroxyl groups in the molecule thereof (any one of C1 to C4) or the phenol aromatic compound having one hydroxyl group in the molecule thereof (C5 or C6), were measured for curing light dose, and the appearance of cured and uncured coated films made of each ink was observed.

Although the results are not shown in Tables 1 to 12, they were comparable to the results shown in Tables 1 to 12 (those of the mixtures of Preparation Examples 1 to 120); i.e., remained unchanged.

TABLE 1

| Preparation Ex. | | 1 | 2 | 3 | 4 | 5 | 6 | 7 | 8 | 9 | 10 |
|---|---|---|---|---|---|---|---|---|---|---|---|
| Photopoly- | A1 | — | 5 | — | — | — | — | — | — | — | — |
| merizable | A2 | — | — | 5 | — | — | — | — | — | — | — |
| monomer | A3 | — | — | — | 5 | — | — | — | — | — | — |
| | A4 | — | — | — | — | 5 | — | — | — | — | — |
| | A5 | 100 | 95 | 95 | 95 | 95 | 95 | 95 | 95 | 95 | 95 |
| | A6 | — | — | — | — | — | 5 | — | — | — | — |
| | A7 | — | — | — | — | — | — | 5 | — | — | — |
| | A8 | — | — | — | — | — | — | — | 5 | — | — |
| | A9 | — | — | — | — | — | — | — | — | 5 | — |
| | A10 | — | — | — | — | — | — | — | — | — | 5 |
| | A11 | — | — | — | — | — | — | — | — | — | — |
| | A12 | — | — | — | — | — | — | — | — | — | — |
| | A13 | — | — | — | — | — | — | — | — | — | — |
| | A14 | — | — | — | — | — | — | — | — | — | — |
| | A15 | — | — | — | — | — | — | — | — | — | — |
| | A16 | — | — | — | — | — | — | — | — | — | — |
| | A17 | — | — | — | — | — | — | — | — | — | — |
| | A18 | — | — | — | — | — | — | — | — | — | — |
| | A19 | — | — | — | — | — | — | — | — | — | — |
| | A20 | — | — | — | — | — | — | — | — | — | — |
| | A21 | — | — | — | — | — | — | — | — | — | — |
| | A22 | — | — | — | — | — | — | — | — | — | — |
| | A23 | — | — | — | — | — | — | — | — | — | — |
| Photopoly- | B1-1 | 20 | 20 | 20 | 20 | 20 | 20 | 20 | 20 | 20 | 20 |
| merization | B1-2 | — | — | — | — | — | — | — | — | — | — |
| initiator | B2-1 | — | — | — | — | — | — | — | — | — | — |
| | B2-2 | — | — | — | — | — | — | — | — | — | — |
| Polymeriza- | B3 | — | — | — | — | — | — | — | — | — | — |
| tion | | | | | | | | | | | |
| accelerator | | | | | | | | | | | |
| Curing light dose (mJ/cm$^2$) | | 1,000 | 1,000 | 1,000 | 1,000 | 1,000 | 1,000 | 1,000 | 1,000 | 1,000 | 1,000 |
| Appearance of cured coated film | | t.p. | t.p. | t.p. | t.p. | t.p. | t.p. | t.p. | t.p. | t.p. | t.p. |
| Appearance of uncured coated film | | t.p. | t.p. | t.p. | t.p. | t.p. | t.p. | t.p. | t.p. | t.p. | t.p. |

In Table 1, "t.p." means "transparent."

TABLE 2

| Preparation Ex. | | 11 | 12 | 13 | 14 | 15 | 16 | 17 | 18 | 19 | 20 |
|---|---|---|---|---|---|---|---|---|---|---|---|
| Photopoly- | A1 | — | — | — | — | — | — | — | — | — | — |
| merizable | A2 | — | — | — | — | — | — | — | — | — | — |
| monomer | A3 | — | — | — | — | — | — | — | — | — | — |
| | A4 | — | — | — | — | — | — | — | — | — | — |
| | A5 | 95 | 95 | 95 | 95 | — | — | — | 50 | 50 | — |

TABLE 2-continued

| Preparation Ex. | | 11 | 12 | 13 | 14 | 15 | 16 | 17 | 18 | 19 | 20 |
|---|---|---|---|---|---|---|---|---|---|---|---|
| | A6 | — | — | — | — | — | — | — | — | — | — |
| | A7 | — | — | — | — | 40 | 40 | 15 | — | — | — |
| | A8 | — | — | — | — | — | — | — | — | — | — |
| | A9 | — | — | — | — | — | — | — | — | — | — |
| | A10 | — | — | — | — | 10 | 10 | — | — | — | — |
| | A11 | 5 | — | — | — | — | — | — | — | — | — |
| | A12 | — | 5 | — | — | — | — | — | — | — | — |
| | A13 | — | — | 5 | — | — | — | — | — | — | — |
| | A14 | — | — | — | 5 | — | — | — | — | — | — |
| | A15 | — | — | — | — | 50 | 30 | — | — | — | — |
| | A16 | — | — | — | — | — | 10 | — | — | — | — |
| | A17 | — | — | — | — | — | 10 | — | — | — | — |
| | A18 | — | — | — | — | — | — | 85 | — | — | — |
| | A19 | — | — | — | — | — | — | — | 5 | — | — |
| | A20 | — | — | — | — | — | — | — | 40 | 45 | 50 |
| | A21 | — | — | — | — | — | — | — | 5 | — | — |
| | A22 | — | — | — | — | — | — | — | — | 5 | — |
| | A23 | — | — | — | — | — | — | — | — | — | 50 |
| Photopoly-merization initiator | B1-1 | 20 | 20 | 20 | 20 | 10 | 10 | 10 | 20 | 20 | 20 |
| | B1-2 | — | — | — | — | — | — | — | — | — | — |
| | B2-1 | — | — | — | — | — | — | — | — | — | — |
| | B2-2 | — | — | — | — | — | — | — | — | — | — |
| Polymeriza-tion accelerator | B3 | — | — | — | — | — | — | — | — | — | — |
| Curing light dose (mJ/cm$^2$) | | 1,000 | 1,000 | 1,000 | 1,000 | 20 | 20 | 100 | 1,000 | 1,000 | 1,000 |
| Appearance of cured coated film | | t.p. | t.p. | t.p. | t.p. | t.p. | t.p. | t.p. | t.p. | t.p. | t.p. |
| Appearance of uncured coated film | | t.p. | t.p. | t.p. | t.p. | t.p. | t.p. | t.p. | t.p. | t.p. | t.p. |

In Table 2, "t.p." means "transparent."

TABLE 3

| Preparation Ex. | | 21 | 22 | 23 | 24 | 25 | 26 | 27 | 28 | 29 | 30 |
|---|---|---|---|---|---|---|---|---|---|---|---|
| Photopoly-merizable monomer | A1 | — | 5 | — | — | — | — | — | — | — | — |
| | A2 | — | — | 5 | — | — | — | — | — | — | — |
| | A3 | — | — | — | 5 | — | — | — | — | — | — |
| | A4 | — | — | — | — | 5 | — | — | — | — | — |
| | A5 | 100 | 95 | 95 | 95 | 95 | 95 | 95 | 95 | 95 | 95 |
| | A6 | — | — | — | — | — | 5 | — | — | — | — |
| | A7 | — | — | — | — | — | — | 5 | — | — | — |
| | A8 | — | — | — | — | — | — | — | 5 | — | — |
| | A9 | — | — | — | — | — | — | — | — | 5 | — |
| | A10 | — | — | — | — | — | — | — | — | — | 5 |
| | A11 | — | — | — | — | — | — | — | — | — | — |
| | A12 | — | — | — | — | — | — | — | — | — | — |
| | A13 | — | — | — | — | — | — | — | — | — | — |
| | A14 | — | — | — | — | — | — | — | — | — | — |
| | A15 | — | — | — | — | — | — | — | — | — | — |
| | A16 | — | — | — | — | — | — | — | — | — | — |
| | A17 | — | — | — | — | — | — | — | — | — | — |
| | A18 | — | — | — | — | — | — | — | — | — | — |
| | A19 | — | — | — | — | — | — | — | — | — | — |
| | A20 | — | — | — | — | — | — | — | — | — | — |
| | A21 | — | — | — | — | — | — | — | — | — | — |
| | A22 | — | — | — | — | — | — | — | — | — | — |
| | A23 | — | — | — | — | — | — | — | — | — | — |
| Photopoly-merization initiator | B1-1 | — | — | — | — | — | — | — | — | — | — |
| | B1-2 | 20 | 20 | 20 | 20 | 20 | 20 | 20 | 20 | 20 | 20 |
| | B2-1 | — | — | — | — | — | — | — | — | — | — |
| | B2-2 | — | — | — | — | — | — | — | — | — | — |
| Polymeriza-tion accelerator | B3 | — | — | — | — | — | — | — | — | — | — |
| Curing light dose (mJ/cm$^2$) | | 500 | 500 | 500 | 500 | 500 | 500 | 500 | 500 | 500 | 500 |
| Appearance of cured coated film | | t.p. | t.p. | t.p. | t.p. | t.p. | t.p. | t.p. | t.p. | t.p. | t.p. |
| Appearance of uncured coated film | | t.p. | t.p. | t.p. | t.p. | t.p. | t.p. | t.p. | t.p. | t.p. | t.p. |

In Table 3, "t.p." means "transparent."

TABLE 4

| Preparation Ex. | | 31 | 32 | 33 | 34 | 35 | 36 | 37 | 38 | 39 | 40 |
|---|---|---|---|---|---|---|---|---|---|---|---|
| Photopoly-merizable monomer | A1 | — | — | — | — | — | — | — | — | — | — |
| | A2 | — | — | — | — | — | — | — | — | — | — |
| | A3 | — | — | — | — | — | — | — | — | — | — |
| | A4 | — | — | — | — | — | — | — | — | — | — |
| | A5 | 95 | 95 | 95 | 95 | — | — | — | 50 | 50 | — |
| | A6 | — | — | — | — | — | — | — | — | — | — |
| | A7 | — | — | — | — | 40 | 40 | 15 | — | — | — |
| | A8 | — | — | — | — | — | — | — | — | — | — |
| | A9 | — | — | — | — | — | — | — | — | — | — |
| | A10 | — | — | — | — | 10 | 10 | — | — | — | — |
| | A11 | 5 | — | — | — | — | — | — | — | — | — |
| | A12 | — | 5 | — | — | — | — | — | — | — | — |
| | A13 | — | — | 5 | — | — | — | — | — | — | — |
| | A14 | — | — | — | 5 | — | — | — | — | — | — |
| | A15 | — | — | — | — | 50 | 30 | — | — | — | — |
| | A16 | — | — | — | — | — | 10 | — | — | — | — |
| | A17 | — | — | — | — | — | 10 | — | — | — | — |
| | A18 | — | — | — | — | — | — | 85 | — | — | — |
| | A19 | — | — | — | — | — | — | — | 5 | — | — |
| | A20 | — | — | — | — | — | — | — | 40 | 45 | 50 |
| | A21 | — | — | — | — | — | — | — | 5 | — | — |
| | A22 | — | — | — | — | — | — | — | — | 5 | — |
| | A23 | — | — | — | — | — | — | — | — | — | 50 |
| Photopoly-merization initiator | B1-1 | — | — | — | — | — | — | — | — | — | — |
| | B1-2 | 20 | 20 | 20 | 20 | 10 | 10 | 10 | 20 | 20 | 20 |
| | B2-1 | — | — | — | — | — | — | — | — | — | — |
| | B2-2 | — | — | — | — | — | — | — | — | — | — |
| Polymeriza-tion accelerator | B3 | — | — | — | — | — | — | — | — | — | — |
| Curing light dose (mJ/cm$^2$) | | 500 | 500 | 500 | 500 | 10 | 10 | 50 | 500 | 500 | 500 |
| Appearance of cured coated film | | t.p. | t.p. | t.p. | t.p. | t.p. | t.p. | t.p. | t.p. | t.p. | t.p. |
| Appearance of uncured coated film | | t.p. | t.p. | t.p. | t.p. | t.p. | t.p. | t.p. | t.p. | t.p. | t.p. |

In Table 4, "t.p." means "transparent."

TABLE 5

| Preparation Ex. | | 41 | 42 | 43 | 44 | 45 | 46 | 47 | 48 | 49 | 50 |
|---|---|---|---|---|---|---|---|---|---|---|---|
| Photopoly-merizable monomer | A1 | — | 5 | — | — | — | — | — | — | — | — |
| | A2 | — | — | 5 | — | — | — | — | — | — | — |
| | A3 | — | — | — | 5 | — | — | — | — | — | — |
| | A4 | — | — | — | — | 5 | — | — | — | — | — |
| | A5 | 100 | 95 | 95 | 95 | 95 | 95 | 95 | 95 | 95 | 95 |
| | A6 | — | — | — | — | — | 5 | — | — | — | — |
| | A7 | — | — | — | — | — | — | 5 | — | — | — |
| | A8 | — | — | — | — | — | — | — | 5 | — | — |
| | A9 | — | — | — | — | — | — | — | — | 5 | — |
| | A10 | — | — | — | — | — | — | — | — | — | 5 |
| | A11 | — | — | — | — | — | — | — | — | — | — |
| | A12 | — | — | — | — | — | — | — | — | — | — |
| | A13 | — | — | — | — | — | — | — | — | — | — |
| | A14 | — | — | — | — | — | — | — | — | — | — |
| | A15 | — | — | — | — | — | — | — | — | — | — |
| | A16 | — | — | — | — | — | — | — | — | — | — |
| | A17 | — | — | — | — | — | — | — | — | — | — |
| | A18 | — | — | — | — | — | — | — | — | — | — |
| | A19 | — | — | — | — | — | — | — | — | — | — |
| | A20 | — | — | — | — | — | — | — | — | — | — |
| | A21 | — | — | — | — | — | — | — | — | — | — |
| | A22 | — | — | — | — | — | — | — | — | — | — |
| | A23 | — | — | — | — | — | — | — | — | — | — |
| Photopoly-merization initiator | B1-1 | 15 | 15 | 15 | 15 | 15 | 15 | 15 | 15 | 15 | 15 |
| | B1-2 | — | — | — | — | — | — | — | — | — | — |
| | B2-1 | 10 | 10 | 10 | 10 | 10 | 10 | 10 | 10 | 10 | 10 |
| | B2-2 | — | — | — | — | — | — | — | — | — | — |
| Polymeriza-tion accelerator | B3 | 10 | 10 | 10 | 10 | 10 | 10 | 10 | 10 | 10 | 10 |
| Curing light dose (mJ/cm$^2$) | | 500 | 500 | 500 | 500 | 500 | 500 | 500 | 500 | 500 | 500 |

TABLE 5-continued

| Preparation Ex. | 41 | 42 | 43 | 44 | 45 | 46 | 47 | 48 | 49 | 50 |
|---|---|---|---|---|---|---|---|---|---|---|
| Appearance of cured coated film | t.p. | t.p. | t.p. | t.p. | t.p. | t.p. | t.p. | t.p. | t.p. | t.p. |
| Appearance of uncured coated film | t.w. | t.w. | t.w. | t.w. | t.w. | t.w. | t.w. | t.w. | t.w. | t.w. |

In Table 5, "t.p." means "transparent" and "t.w." means "turbid in white."

TABLE 6

| Preparation Ex. | | 51 | 52 | 53 | 54 | 55 | 56 | 57 | 58 | 59 | 60 |
|---|---|---|---|---|---|---|---|---|---|---|---|
| Photopoly-merizable monomer | A1 | — | — | — | — | — | — | — | — | — | — |
| | A2 | — | — | — | — | — | — | — | — | — | — |
| | A3 | — | — | — | — | — | — | — | — | — | — |
| | A4 | — | — | — | — | — | — | — | — | — | — |
| | A5 | 95 | 95 | 95 | 95 | — | — | — | 50 | 50 | — |
| | A6 | — | — | — | — | — | — | — | — | — | — |
| | A7 | — | — | — | — | 40 | 40 | 15 | — | — | — |
| | A8 | — | — | — | — | — | — | — | — | — | — |
| | A9 | — | — | — | — | — | — | — | — | — | — |
| | A10 | — | — | — | — | 10 | 10 | — | — | — | — |
| | A11 | 5 | — | — | — | — | — | — | — | — | — |
| | A12 | — | 5 | — | — | — | — | — | — | — | — |
| | A13 | — | — | 5 | — | — | — | — | — | — | — |
| | A14 | — | — | — | 5 | — | — | — | — | — | — |
| | A15 | — | — | — | — | 50 | 30 | — | — | — | — |
| | A16 | — | — | — | — | — | 10 | — | — | — | — |
| | A17 | — | — | — | — | — | 10 | — | — | — | — |
| | A18 | — | — | — | — | — | — | 85 | — | — | — |
| | A19 | — | — | — | — | — | — | — | 5 | — | — |
| | A20 | — | — | — | — | — | — | — | 40 | 45 | 50 |
| | A21 | — | — | — | — | — | — | — | 5 | — | — |
| | A22 | — | — | — | — | — | — | — | — | 5 | — |
| | A23 | — | — | — | — | — | — | — | — | — | 50 |
| Photopoly-merization initiator | B1-1 | 15 | 15 | 15 | 15 | 5 | 5 | 5 | 15 | 15 | 15 |
| | B1-2 | — | — | — | — | — | — | — | — | — | — |
| | B2-1 | 10 | 10 | 10 | 10 | 5 | 5 | 5 | 10 | 10 | 10 |
| | B2-2 | — | — | — | — | — | — | — | — | — | — |
| Polymerization accelerator | B3 | 10 | 10 | 10 | 10 | 5 | 5 | 5 | 10 | 10 | 10 |
| Curing light dose (mJ/cm$^2$) | | 500 | 500 | 500 | 500 | 10 | 10 | 50 | 500 | 500 | 500 |
| Appearance of cured coated film | | t.p. | t.p. | t.p. | t.p. | t.p. | t.p. | t.p. | t.p. | t.p. | t.p. |
| Appearance of uncured coated film | | t.w. | t.w. | t.w. | t.w. | t.w. | t.w. | t.w. | t.w. | t.w. | t.w. |

In Table 6, "t.p." means "transparent" and "t.w." means "turbid in white."

TABLE 7

| Preparation Ex. | | 61 | 62 | 63 | 64 | 65 | 66 | 67 | 68 | 69 | 70 |
|---|---|---|---|---|---|---|---|---|---|---|---|
| Photopoly-merizable monomer | A1 | — | 5 | — | — | — | — | — | — | — | — |
| | A2 | — | — | 5 | — | — | — | — | — | — | — |
| | A3 | — | — | — | 5 | — | — | — | — | — | — |
| | A4 | — | — | — | — | 5 | — | — | — | — | — |
| | A5 | 100 | 95 | 95 | 95 | 95 | 95 | 95 | 95 | 95 | 95 |
| | A6 | — | — | — | — | — | 5 | — | — | — | — |
| | A7 | — | — | — | — | — | — | 5 | — | — | — |
| | A8 | — | — | — | — | — | — | — | 5 | — | — |
| | A9 | — | — | — | — | — | — | — | — | 5 | — |
| | A10 | — | — | — | — | — | — | — | — | — | 5 |
| | A11 | — | — | — | — | — | — | — | — | — | — |
| | A12 | — | — | — | — | — | — | — | — | — | — |
| | A13 | — | — | — | — | — | — | — | — | — | — |
| | A14 | — | — | — | — | — | — | — | — | — | — |
| | A15 | — | — | — | — | — | — | — | — | — | — |
| | A16 | — | — | — | — | — | — | — | — | — | — |
| | A17 | — | — | — | — | — | — | — | — | — | — |

TABLE 7-continued

| Preparation Ex. | | 61 | 62 | 63 | 64 | 65 | 66 | 67 | 68 | 69 | 70 |
|---|---|---|---|---|---|---|---|---|---|---|---|
| | A18 | — | — | — | — | — | — | — | — | — | — |
| | A19 | — | — | — | — | — | — | — | — | — | — |
| | A20 | — | — | — | — | — | — | — | — | — | — |
| | A21 | — | — | — | — | — | — | — | — | — | — |
| | A22 | — | — | — | — | — | — | — | — | — | — |
| | A23 | — | — | — | — | — | — | — | — | — | — |
| Photopoly-merization initiator | B1-1 | 15 | 15 | 15 | 15 | 15 | 15 | 15 | 15 | 15 | 15 |
| | B1-2 | — | — | — | — | — | — | — | — | — | — |
| | B2-1 | — | — | — | — | — | — | — | — | — | — |
| | B2-2 | 10 | 10 | 10 | 10 | 10 | 10 | 10 | 10 | 10 | 10 |
| Polymerization accelerator | B3 | 10 | 10 | 10 | 10 | 10 | 10 | 10 | 10 | 10 | 10 |
| Curing light dose (mJ/cm$^2$) | | 500 | 500 | 500 | 500 | 500 | 500 | 500 | 500 | 500 | 500 |
| Appearance of cured coated film | | t.p. | t.p. | t.p. | t.p. | t.p. | t.p. | t.p. | t.p. | t.p. | t.p. |
| Appearance of uncured coated film | | t.w. | t.w. | t.w. | t.w. | t.w. | t.w. | t.w. | t.w. | t.w. | t.w. |

In Table 7, "t.p." means "transparent" and "t.w." means "turbid in white."

TABLE 8

| Preparation Ex. | | 71 | 72 | 73 | 74 | 75 | 76 | 77 | 78 | 79 | 80 |
|---|---|---|---|---|---|---|---|---|---|---|---|
| Photopoly-merizable monomer | A1 | — | — | — | — | — | — | — | — | — | — |
| | A2 | — | — | — | — | — | — | — | — | — | — |
| | A3 | — | — | — | — | — | — | — | — | — | — |
| | A4 | — | — | — | — | — | — | — | — | — | — |
| | A5 | 95 | 95 | 95 | 95 | — | — | — | 50 | 50 | — |
| | A6 | — | — | — | — | — | — | — | — | — | — |
| | A7 | — | — | — | — | 40 | 40 | 15 | — | — | — |
| | A8 | — | — | — | — | — | — | — | — | — | — |
| | A9 | — | — | — | — | — | — | — | — | — | — |
| | A10 | — | — | — | — | 10 | 10 | — | — | — | — |
| | A11 | 5 | — | — | — | — | — | — | — | — | — |
| | A12 | — | 5 | — | — | — | — | — | — | — | — |
| | A13 | — | — | 5 | — | — | — | — | — | — | — |
| | A14 | — | — | — | 5 | — | — | — | — | — | — |
| | A15 | — | — | — | — | 50 | 30 | — | — | — | — |
| | A16 | — | — | — | — | — | 10 | — | — | — | — |
| | A17 | — | — | — | — | — | 10 | — | — | — | — |
| | A18 | — | — | — | — | — | — | 85 | — | — | — |
| | A19 | — | — | — | — | — | — | — | 5 | — | — |
| | A20 | — | — | — | — | — | — | — | 40 | 45 | 50 |
| | A21 | — | — | — | — | — | — | — | 5 | — | — |
| | A22 | — | — | — | — | — | — | — | — | 5 | — |
| | A23 | — | — | — | — | — | — | — | — | — | 50 |
| Photopoly-merization initiator | B1-1 | 15 | 15 | 15 | 15 | 5 | 5 | 5 | 15 | 15 | 15 |
| | B1-2 | — | — | — | — | — | — | — | — | — | — |
| | B2-1 | — | — | — | — | — | — | — | — | — | — |
| | B2-2 | 10 | 10 | 10 | 10 | 5 | 5 | 5 | 10 | 10 | 10 |
| Polymerization accelerator | B3 | 10 | 10 | 10 | 10 | 5 | 5 | 5 | 10 | 10 | 10 |
| Curing light dose (mJ/cm$^2$) | | 500 | 500 | 500 | 500 | 10 | 10 | 50 | 500 | 500 | 500 |
| Appearance of cured coated film | | t.p. | t.p. | t.p. | t.p. | t.p. | t.p. | t.p. | t.p. | t.p. | t.p. |
| Appearance of uncured coated film | | t.w. | t.w. | t.w. | t.w. | t.w. | t.w. | t.w. | t.w. | t.w. | t.w. |

In Table 8, "t.p." means "transparent" and "t.w." means "turbid in white."

TABLE 9

| Preparation Ex. | | 81 | 82 | 83 | 84 | 85 | 86 | 87 | 88 | 89 | 90 |
|---|---|---|---|---|---|---|---|---|---|---|---|
| Photopoly-merizable | A1 | — | 5 | — | — | — | — | — | — | — | — |
| | A2 | — | — | 5 | — | — | — | — | — | — | — |

TABLE 9-continued

| Preparation Ex. | | 81 | 82 | 83 | 84 | 85 | 86 | 87 | 88 | 89 | 90 |
|---|---|---|---|---|---|---|---|---|---|---|---|
| monomer | A3 | — | — | — | 5 | — | — | — | — | — | — |
| | A4 | — | — | — | — | 5 | — | — | — | — | — |
| | A5 | 100 | 95 | 95 | 95 | 95 | 95 | 95 | 95 | 95 | 95 |
| | A6 | — | — | — | — | — | 5 | — | — | — | — |
| | A7 | — | — | — | — | — | — | 5 | — | — | — |
| | A8 | — | — | — | — | — | — | — | 5 | — | — |
| | A9 | — | — | — | — | — | — | — | — | 5 | — |
| | A10 | — | — | — | — | — | — | — | — | — | 5 |
| | A11 | — | — | — | — | — | — | — | — | — | — |
| | A12 | — | — | — | — | — | — | — | — | — | — |
| | A13 | — | — | — | — | — | — | — | — | — | — |
| | A14 | — | — | — | — | — | — | — | — | — | — |
| | A15 | — | — | — | — | — | — | — | — | — | — |
| | A16 | — | — | — | — | — | — | — | — | — | — |
| | A17 | — | — | — | — | — | — | — | — | — | — |
| | A18 | — | — | — | — | — | — | — | — | — | — |
| | A19 | — | — | — | — | — | — | — | — | — | — |
| | A20 | — | — | — | — | — | — | — | — | — | — |
| | A21 | — | — | — | — | — | — | — | — | — | — |
| | A22 | — | — | — | — | — | — | — | — | — | — |
| | A23 | — | — | — | — | — | — | — | — | — | — |
| Photopoly- | B1-1 | — | — | — | — | — | — | — | — | — | — |
| merization | B1-2 | 15 | 15 | 15 | 15 | 15 | 15 | 15 | 15 | 15 | 15 |
| initiator | B2-1 | 10 | 10 | 10 | 10 | 10 | 10 | 10 | 10 | 10 | 10 |
| | B2-2 | — | — | — | — | — | — | — | — | — | — |
| Polymeriza-tion accelerator | B3 | 10 | 10 | 10 | 10 | 10 | 10 | 10 | 10 | 10 | 10 |
| Curing light dose (mJ/cm$^2$) | | 300 | 300 | 300 | 300 | 300 | 300 | 300 | 300 | 300 | 300 |
| Appearance of cured coated film | | t.p. | t.p. | t.p. | t.p. | t.p. | t.p. | t.p. | t.p. | t.p. | t.p. |
| Appearance of uncured coated film | | t.w. | t.w. | t.w. | t.w. | t.w. | t.w. | t.w. | t.w. | t.w. | t.w. |

In Table 9, "t.p." means "transparent" and "t.w." means "turbid in white."

TABLE 10

| Preparation Ex. | | 91 | 92 | 93 | 94 | 95 | 96 | 97 | 98 | 99 | 100 |
|---|---|---|---|---|---|---|---|---|---|---|---|
| Photopoly- | A1 | — | — | — | — | — | — | — | — | — | — |
| merizable | A2 | — | — | — | — | — | — | — | — | — | — |
| monomer | A3 | — | — | — | — | — | — | — | — | — | — |
| | A4 | — | — | — | — | — | — | — | — | — | — |
| | A5 | 95 | 95 | 95 | 95 | — | — | — | 50 | 50 | — |
| | A6 | — | — | — | — | — | — | — | — | — | — |
| | A7 | — | — | — | — | 40 | 40 | 15 | — | — | — |
| | A8 | — | — | — | — | — | — | — | — | — | — |
| | A9 | — | — | — | — | — | — | — | — | — | — |
| | A10 | — | — | — | — | 10 | 10 | — | — | — | — |
| | A11 | 5 | — | — | — | — | — | — | — | — | — |
| | A12 | — | 5 | — | — | — | — | — | — | — | — |
| | A13 | — | — | 5 | — | — | — | — | — | — | — |
| | A14 | — | — | — | 5 | — | — | — | — | — | — |
| | A15 | — | — | — | — | 50 | 30 | — | — | — | — |
| | A16 | — | — | — | — | — | 10 | — | — | — | — |
| | A17 | — | — | — | — | — | 10 | — | — | — | — |
| | A18 | — | — | — | — | — | — | 85 | — | — | — |
| | A19 | — | — | — | — | — | — | — | 5 | — | — |
| | A20 | — | — | — | — | — | — | — | 40 | 45 | 50 |
| | A21 | — | — | — | — | — | — | — | 5 | — | — |
| | A22 | — | — | — | — | — | — | — | — | 5 | — |
| | A23 | — | — | — | — | — | — | — | — | — | 50 |
| Photopoly- | B1-1 | — | — | — | — | — | — | — | — | — | — |
| merization | B1-2 | 15 | 15 | 15 | 15 | 5 | 5 | 5 | 15 | 15 | 15 |
| initiator | B2-1 | 10 | 10 | 10 | 10 | 5 | 5 | 5 | 10 | 10 | 10 |
| | B2-2 | — | — | — | — | — | — | — | — | — | — |
| Polymeriza-tion accelerator | B3 | 10 | 10 | 10 | 10 | 5 | 5 | 5 | 10 | 10 | 10 |
| Curing light dose (mJ/cm$^2$) | | 300 | 300 | 300 | 300 | 5 | 5 | 30 | 300 | 300 | 300 |
| Appearance of cured coated film | | t.p. | t.p. | t.p. | t.p. | t.p. | t.p. | t.p. | t.p. | t.p. | t.p. |

TABLE 10-continued

| Preparation Ex. | 91 | 92 | 93 | 94 | 95 | 96 | 97 | 98 | 99 | 100 |
|---|---|---|---|---|---|---|---|---|---|---|
| Appearance of uncured coated film | t.w. | t.w. | t.w. | t.w. | t.w. | t.w. | t.w. | t.w. | t.w. | t.w. |

In Table 10, "t.p." means "transparent" and "t.w." means "turbid in white."

TABLE 11

| Preparation Ex. | | 101 | 102 | 103 | 104 | 105 | 106 | 107 | 108 | 109 | 110 |
|---|---|---|---|---|---|---|---|---|---|---|---|
| Photopoly-merizable monomer | A1 | — | 5 | — | — | — | — | — | — | — | — |
| | A2 | — | — | 5 | — | — | — | — | — | — | — |
| | A3 | — | — | — | 5 | — | — | — | — | — | — |
| | A4 | — | — | — | — | 5 | — | — | — | — | — |
| | A5 | 100 | 95 | 95 | 95 | 95 | 95 | 95 | 95 | 95 | 95 |
| | A6 | — | — | — | — | — | 5 | — | — | — | — |
| | A7 | — | — | — | — | — | — | 5 | — | — | — |
| | A8 | — | — | — | — | — | — | — | 5 | — | — |
| | A9 | — | — | — | — | — | — | — | — | 5 | — |
| | A10 | — | — | — | — | — | — | — | — | — | 5 |
| | A11 | — | — | — | — | — | — | — | — | — | — |
| | A12 | — | — | — | — | — | — | — | — | — | — |
| | A13 | — | — | — | — | — | — | — | — | — | — |
| | A14 | — | — | — | — | — | — | — | — | — | — |
| | A15 | — | — | — | — | — | — | — | — | — | — |
| | A16 | — | — | — | — | — | — | — | — | — | — |
| | A17 | — | — | — | — | — | — | — | — | — | — |
| | A18 | — | — | — | — | — | — | — | — | — | — |
| | A19 | — | — | — | — | — | — | — | — | — | — |
| | A20 | — | — | — | — | — | — | — | — | — | — |
| | A21 | — | — | — | — | — | — | — | — | — | — |
| | A22 | — | — | — | — | — | — | — | — | — | — |
| | A23 | — | — | — | — | — | — | — | — | — | — |
| Photopoly-merization initiator | B1-1 | — | — | — | — | — | — | — | — | — | — |
| | B1-2 | 15 | 15 | 15 | 15 | 15 | 15 | 15 | 15 | 15 | 15 |
| | B2-1 | — | — | — | — | — | — | — | — | — | — |
| | B2-2 | 10 | 10 | 10 | 10 | 10 | 10 | 10 | 10 | 10 | 10 |
| Polymeriza-tion accelerator | B3 | 10 | 10 | 10 | 10 | 10 | 10 | 10 | 10 | 10 | 10 |
| Curing light dose (mJ/cm$^2$) | | 300 | 300 | 300 | 300 | 300 | 300 | 300 | 300 | 300 | 300 |
| Appearance of cured coated film | | t.p. | t.p. | t.p. | t.p. | t.p. | t.p. | t.p. | t.p. | t.p. | t.p. |
| Appearance of uncured coated film | | t.w. | t.w. | t.w. | t.w. | t.w. | t.w. | t.w. | t.w. | t.w. | t.w. |

In Table 11, "t.p." means "transparent" and "t.w." means "turbid in white."

TABLE 12

| Preparation Ex. | | 111 | 112 | 113 | 114 | 115 | 116 | 117 | 118 | 119 | 120 |
|---|---|---|---|---|---|---|---|---|---|---|---|
| Photopoly-merizable monomer | A1 | — | — | — | — | — | — | — | — | — | — |
| | A2 | — | — | — | — | — | — | — | — | — | — |
| | A3 | — | — | — | — | — | — | — | — | — | — |
| | A4 | — | — | — | — | — | — | — | — | — | — |
| | A5 | 95 | 95 | 95 | 95 | — | — | — | 50 | 50 | — |
| | A6 | — | — | — | — | — | — | — | — | — | — |
| | A7 | — | — | — | — | 40 | 40 | 15 | — | — | — |
| | A8 | — | — | — | — | — | — | — | — | — | — |
| | A9 | — | — | — | — | — | — | — | — | — | — |
| | A10 | — | — | — | — | 10 | 10 | — | — | — | — |
| | A11 | 5 | — | — | — | — | — | — | — | — | — |
| | A12 | — | 5 | — | — | — | — | — | — | — | — |
| | A13 | — | — | 5 | — | — | — | — | — | — | — |
| | A14 | — | — | — | 5 | — | — | — | — | — | — |
| | A15 | — | — | — | — | 50 | 30 | — | — | — | — |
| | A16 | — | — | — | — | — | 10 | — | — | — | — |
| | A17 | — | — | — | — | — | 10 | — | — | — | — |
| | A18 | — | — | — | — | — | — | 85 | — | — | — |
| | A19 | — | — | — | — | — | — | — | 5 | — | — |
| | A20 | — | — | — | — | — | — | — | 40 | 45 | 50 |
| | A21 | — | — | — | — | — | — | — | 5 | — | — |

TABLE 12-continued

| Preparation Ex. | | 111 | 112 | 113 | 114 | 115 | 116 | 117 | 118 | 119 | 120 |
|---|---|---|---|---|---|---|---|---|---|---|---|
| | A22 | — | — | — | — | — | — | — | — | 5 | — |
| | A23 | — | — | — | — | — | — | — | — | — | 50 |
| Photopoly-merization initiator | B1-1 | — | — | — | — | — | — | — | — | — | — |
| | B1-2 | 15 | 15 | 15 | 15 | 5 | 5 | 5 | 15 | 15 | 15 |
| | B2-1 | — | — | — | — | — | — | — | — | — | — |
| | B2-2 | 10 | 10 | 10 | 10 | 5 | 5 | 5 | 10 | 10 | 10 |
| Polymerization accelerator | B3 | 10 | 10 | 10 | 10 | 5 | 5 | 5 | 10 | 10 | 10 |
| Curing light dose (mJ/cm$^2$) | | 300 | 300 | 300 | 300 | 5 | 5 | 30 | 300 | 300 | 300 |
| Appearance of cured coated film | | t.p. | t.p. | t.p. | t.p. | t.p. | t.p. | t.p. | t.p. | t.p. | t.p. |
| Appearance of uncured coated film | | t.w. | t.w. | t.w. | t.w. | t.w. | t.w. | t.w. | t.w. | t.w. | t.w. |

In Table 12, "t.p." means "transparent" and "t.w." means "turbid in white."

TABLE 13-1

Phenol aromatic compound having two hydroxyl groups in the molecule thereof

| | | C1 | | C2 | | C3 | |
|---|---|---|---|---|---|---|---|
| | | Ex. | Rate of change (%) | Ex. | Rate of change (%) | Ex. | Rate of change (%) |
| Prep. Ex.* | 1 | Ex. 1 | +1.5 | Ex. 21 | +0.9 | Ex. 41 | +1.2 |
| | 2 | Ex. 2 | +1.2 | Ex. 22 | +0.8 | Ex. 42 | +0.7 |
| | 3 | Ex. 3 | +1.4 | Ex. 23 | +1.2 | Ex. 43 | +1.4 |
| | 4 | Ex. 4 | +1.3 | Ex. 24 | +1.1 | Ex. 44 | +0.8 |
| | 5 | Ex. 5 | +1.8 | Ex. 25 | +1.0 | Ex. 45 | +1.2 |
| | 6 | Ex. 6 | +1.1 | Ex. 26 | +0.7 | Ex. 46 | +1.3 |
| | 7 | Ex. 7 | +1.6 | Ex. 27 | +0.9 | Ex. 47 | +0.7 |
| | 8 | Ex. 8 | +1.5 | Ex. 28 | +1.1 | Ex. 48 | +0.7 |
| | 9 | Ex. 9 | +1.9 | Ex. 29 | +1.3 | Ex. 49 | +0.9 |
| | 10 | Ex. 10 | +1.2 | Ex. 30 | +0.7 | Ex. 50 | +0.9 |
| | 11 | Ex. 11 | +1.4 | Ex. 31 | +1.4 | Ex. 51 | +0.8 |
| | 12 | Ex. 12 | +1.5 | Ex. 32 | +1.5 | Ex. 52 | +1.4 |
| | 13 | Ex. 13 | +1.2 | Ex. 33 | +0.8 | Ex. 53 | +1.5 |
| | 14 | Ex. 14 | +0.9 | Ex. 34 | +0.9 | Ex. 54 | +0.8 |
| | 15 | Ex. 15 | +1.0 | Ex. 35 | +0.9 | Ex. 55 | +1.0 |
| | 16 | Ex. 16 | +1.3 | Ex. 36 | +1.3 | Ex. 56 | +1.2 |
| | 17 | Ex. 17 | +1.6 | Ex. 37 | +1.0 | Ex. 57 | +1.1 |
| | 18 | Ex. 18 | +1.9 | Ex. 38 | +1.4 | Ex. 58 | +1.2 |
| | 19 | Ex. 19 | +1.8 | Ex. 39 | +1.9 | Ex. 59 | +1.7 |
| | 20 | Ex. 20 | +1.6 | Ex. 40 | +1.1 | Ex. 60 | +1.2 |

*Prep. Ex. means "Preparation Example," and the mixture prepared in each Preparation Example was used to prepare the inks of Examples described in the same row.

TABLE 13-2

Phenol aromatic compound having two hydroxyl groups in the molecule thereof

| | | C4 | | C5 | | C6 | |
|---|---|---|---|---|---|---|---|
| | | Ex. | Rate of change (%) | Comp. Ex. | Rate of change (%) | Comp. Ex. | Rate of change (%) |
| Prep. Ex.* | 1 | Ex. 61 | +0.8 | Comp. Ex. 1 | gelation | Comp. Ex. 21 | gelation |
| | 2 | Ex. 62 | +1.3 | Comp. Ex. 2 | gelation | Comp. Ex. 22 | gelation |
| | 3 | Ex. 63 | +0.7 | Comp. Ex. 3 | gelation | Comp. Ex. 23 | gelation |
| | 4 | Ex. 64 | +0.7 | Comp. Ex. 4 | gelation | Comp. Ex. 24 | gelation |
| | 5 | Ex. 65 | +0.7 | Comp. Ex. 5 | gelation | Comp. Ex. 25 | gelation |
| | 6 | Ex. 66 | +0.9 | Comp. Ex. 6 | gelation | Comp. Ex. 26 | gelation |
| | 7 | Ex. 67 | +0.8 | Comp. Ex. 7 | gelation | Comp. Ex. 27 | gelation |
| | 8 | Ex. 68 | +0.8 | Comp. Ex. 8 | gelation | Comp. Ex. 28 | gelation |
| | 9 | Ex. 69 | +1.4 | Comp. Ex. 9 | gelation | Comp. Ex. 29 | gelation |
| | 10 | Ex. 70 | +0.7 | Comp. Ex. 10 | gelation | Comp. Ex. 30 | gelation |
| | 11 | Ex. 71 | +0.7 | Comp. Ex. 11 | gelation | Comp. Ex. 31 | gelation |
| | 12 | Ex. 72 | +0.8 | Comp. Ex. 12 | gelation | Comp. Ex. 32 | gelation |
| | 13 | Ex. 73 | +1.4 | Comp. Ex. 13 | gelation | Comp. Ex. 33 | gelation |
| | 14 | Ex. 74 | +0.6 | Comp. Ex. 14 | gelation | Comp. Ex. 34 | gelation |
| | 15 | Ex. 75 | +1.4 | Comp. Ex. 15 | gelation | Comp. Ex. 35 | gelation |
| | 16 | Ex. 76 | +1.7 | Comp. Ex. 16 | gelation | Comp. Ex. 36 | gelation |
| | 17 | Ex. 77 | +1.6 | Comp. Ex. 17 | gelation | Comp. Ex. 37 | gelation |
| | 18 | Ex. 78 | +1.4 | Comp. Ex. 18 | gelation | Comp. Ex. 38 | gelation |
| | 19 | Ex. 79 | +1.3 | Comp. Ex. 19 | gelation | Comp. Ex. 39 | gelation |
| | 20 | Ex. 80 | +1.5 | Comp. Ex. 20 | gelation | Comp. Ex. 40 | gelation |

*Prep. Ex. means "Preparation Example," and the mixture prepared in each Preparation Example was used to prepare the inks of Examples and Comparative Examples described in the same row.

TABLE 14-1

Phenol aromatic compound having two hydroxyl groups in the molecule thereof

| | | C1 | | C2 | | C3 | |
|---|---|---|---|---|---|---|---|
| | | Ex. | Rate of change (%) | Ex. | Rate of change (%) | Ex. | Rate of change (%) |
| Prep. Ex.* | 21 | Ex. 81 | +1.8 | Ex. 101 | +1.6 | Ex. 121 | +0.9 |
| | 22 | Ex. 82 | +1.9 | Ex. 102 | +1.2 | Ex. 122 | +1.5 |
| | 23 | Ex. 83 | +2.1 | Ex. 103 | +1.5 | Ex. 123 | +1.1 |

TABLE 14-1-continued

Phenol aromatic compound having two hydroxyl groups in the molecule thereof

| | C1 | | C2 | | C3 | |
|---|---|---|---|---|---|---|
| | Ex. | Rate of change (%) | Ex. | Rate of change (%) | Ex. | Rate of change (%) |
| 24 | Ex. 84 | +1.5 | Ex. 104 | +1.6 | Ex. 124 | +1.2 |
| 25 | Ex. 85 | +2.0 | Ex. 105 | +1.5 | Ex. 125 | +0.7 |
| 26 | Ex. 86 | +1.8 | Ex. 106 | +1.1 | Ex. 126 | +1.0 |
| 27 | Ex. 87 | +1.7 | Ex. 107 | +1.5 | Ex. 127 | +0.8 |
| 28 | Ex. 88 | +1.8 | Ex. 108 | +1.8 | Ex. 128 | +0.7 |
| 29 | Ex. 89 | +2.2 | Ex. 109 | +1.6 | Ex. 129 | +0.6 |
| 30 | Ex. 90 | +2.0 | Ex. 110 | +1.8 | Ex. 130 | +1.0 |
| 31 | Ex. 91 | +1.2 | Ex. 111 | +1.9 | Ex. 131 | +0.7 |
| 32 | Ex. 92 | +2.1 | Ex. 112 | +1.8 | Ex. 132 | +0.6 |
| 33 | Ex. 93 | +2.1 | Ex. 113 | +1.5 | Ex. 133 | +0.8 |
| 34 | Ex. 94 | +1.8 | Ex. 114 | +1.9 | Ex. 134 | +0.7 |
| 35 | Ex. 95 | +1.5 | Ex. 115 | +1.5 | Ex. 135 | +0.8 |
| 36 | Ex. 96 | +2.0 | Ex. 116 | +1.5 | Ex. 136 | +0.8 |
| 37 | Ex. 97 | +1.8 | Ex. 117 | +1.6 | Ex. 137 | +0.9 |
| 38 | Ex. 98 | +1.5 | Ex. 118 | +1.7 | Ex. 138 | +1.0 |
| 39 | Ex. 99 | +1.9 | Ex. 119 | +1.8 | Ex. 139 | +1.1 |
| 40 | Ex. 100 | +2.1 | Ex. 120 | +1.0 | Ex. 140 | +1.0 |

*Prep. Ex. means "Preparation Example," and the mixture prepared in each Preparation Example was used to prepare the inks of Examples described in the same row.

TABLE 14-2

Phenol aromatic compound having two hydroxyl groups in the molecule thereof

| | | C4 | | C5 | | C6 | |
|---|---|---|---|---|---|---|---|
| | | Ex. | Rate of change (%) | Comp. Ex. | Rate of change (%) | Comp. Ex. | Rate of change (%) |
| Prep. Ex.* | 21 | Ex. 141 | +0.7 | Comp. Ex. 41 | gelation | Comp. Ex. 61 | gelation |
| | 22 | Ex. 142 | +0.9 | Comp. Ex. 42 | gelation | Comp. Ex. 62 | gelation |
| | 23 | Ex. 143 | +0.8 | Comp. Ex. 43 | gelation | Comp. Ex. 63 | gelation |
| | 24 | Ex. 144 | +1.0 | Comp. Ex. 44 | gelation | Comp. Ex. 64 | gelation |
| | 25 | Ex. 145 | +0.8 | Comp. Ex. 45 | gelation | Comp. Ex. 65 | gelation |
| | 26 | Ex. 146 | +0.8 | Comp. Ex. 46 | gelation | Comp. Ex. 66 | gelation |
| | 27 | Ex. 147 | +1.1 | Comp. Ex. 47 | gelation | Comp. Ex. 67 | gelation |
| | 28 | Ex. 148 | +0.9 | Comp. Ex. 48 | gelation | Comp. Ex. 68 | gelation |
| | 29 | Ex. 149 | +1.1 | Comp. Ex. 49 | gelation | Comp. Ex. 69 | gelation |
| | 30 | Ex. 150 | +0.9 | Comp. Ex. 50 | gelation | Comp. Ex. 70 | gelation |
| | 31 | Ex. 151 | +0.8 | Comp. Ex. 51 | gelation | Comp. Ex. 71 | gelation |
| | 32 | Ex. 152 | +1.1 | Comp. Ex. 52 | gelation | Comp. Ex. 72 | gelation |
| | 33 | Ex. 153 | +1.0 | Comp. Ex. 53 | gelation | Comp. Ex. 73 | gelation |
| | 34 | Ex. 154 | +1.0 | Comp. Ex. 54 | gelation | Comp. Ex. 74 | gelation |
| | 35 | Ex. 155 | +0.9 | Comp. Ex. 55 | gelation | Comp. Ex. 75 | gelation |
| | 36 | Ex. 156 | +1.2 | Comp. Ex. 56 | gelation | Comp. Ex. 76 | gelation |
| | 37 | Ex. 157 | +0.8 | Comp. Ex. 57 | gelation | Comp. Ex. 77 | gelation |
| | 38 | Ex. 158 | +1.2 | Comp. Ex. 58 | gelation | Comp. Ex. 78 | gelation |
| | 39 | Ex. 159 | +1.2 | Comp. Ex. 59 | gelation | Comp. Ex. 79 | gelation |
| | 40 | Ex. 160 | +0.8 | Comp. Ex. 60 | gelation | Comp. Ex. 80 | gelation |

*Prep. Ex. means "Preparation Example," and the mixture prepared in each Preparation Example was used to prepare the inks of Examples and Comparative Examples described in the same row.

TABLE 15-1

Phenol aromatic compound having two hydroxyl groups in the molecule thereof

| | | C1 | | C2 | | C3 | |
|---|---|---|---|---|---|---|---|
| | | Ex. | Rate of change (%) | Ex. | Rate of change (%) | Ex. | Rate of change (%) |
| Prep. Ex.* | 41 | Ex. 161 | +1.5 | Ex. 181 | +0.9 | Ex. 201 | +0.8 |
| | 42 | Ex. 162 | +1.6 | Ex. 182 | +1.3 | Ex. 202 | +0.7 |
| | 43 | Ex. 163 | +1.5 | Ex. 183 | +1.0 | Ex. 203 | +0.6 |
| | 44 | Ex. 164 | +1.1 | Ex. 184 | +1.0 | Ex. 204 | +1.0 |
| | 45 | Ex. 165 | +1.5 | Ex. 185 | +0.9 | Ex. 205 | +1.0 |
| | 46 | Ex. 166 | +1.5 | Ex. 186 | +1.2 | Ex. 206 | +0.9 |
| | 47 | Ex. 167 | +2.0 | Ex. 187 | +1.1 | Ex. 207 | +1.2 |
| | 48 | Ex. 168 | +1.5 | Ex. 188 | +0.9 | Ex. 208 | +0.8 |
| | 49 | Ex. 169 | +1.9 | Ex. 189 | +1.1 | Ex. 209 | +0.7 |
| | 50 | Ex. 170 | +1.2 | Ex. 190 | +1.6 | Ex. 210 | +0.9 |
| | 51 | Ex. 171 | +1.4 | Ex. 191 | +1.2 | Ex. 211 | +0.8 |
| | 52 | Ex. 172 | +1.5 | Ex. 192 | +1.5 | Ex. 212 | +1.0 |
| | 53 | Ex. 173 | +1.6 | Ex. 193 | +1.6 | Ex. 213 | +1.5 |
| | 54 | Ex. 174 | +1.7 | Ex. 194 | +1.0 | Ex. 214 | +1.1 |
| | 55 | Ex. 175 | +1.5 | Ex. 195 | +1.1 | Ex. 215 | +1.5 |
| | 56 | Ex. 176 | +1.1 | Ex. 196 | +1.0 | Ex. 216 | +1.8 |
| | 57 | Ex. 177 | +1.5 | Ex. 197 | +0.9 | Ex. 217 | +0.9 |
| | 58 | Ex. 178 | +1.8 | Ex. 198 | +1.2 | Ex. 218 | +1.1 |
| | 59 | Ex. 179 | +1.9 | Ex. 199 | +0.8 | Ex. 219 | +0.9 |
| | 60 | Ex. 180 | +1.3 | Ex. 200 | +1.2 | Ex. 220 | +0.8 |

*Prep. Ex. means "Preparation Example," and the mixture prepared in each Preparation Example was used to prepare the inks of Examples described in the same row.

TABLE 15-2

Phenol aromatic compound having two hydroxyl groups in the molecule thereof

| | | C4 | | C5 | | C6 | |
|---|---|---|---|---|---|---|---|
| | | Ex. | Rate of change (%) | Comp. Ex. | Rate of change (%) | Comp. Ex. | Rate of change (%) |
| Prep. Ex.* | 41 | Ex. 221 | +1.2 | Comp. Ex. 81 | gelation | Comp. Ex. 101 | gelation |
| | 42 | Ex. 222 | +0.8 | Comp. Ex. 82 | gelation | Comp. Ex. 102 | gelation |
| | 43 | Ex. 223 | +0.7 | Comp. Ex. 83 | gelation | Comp. Ex. 103 | gelation |
| | 44 | Ex. 224 | +0.9 | Comp. Ex. 84 | gelation | Comp. Ex. 104 | gelation |
| | 45 | Ex. 225 | +0.8 | Comp. Ex. 85 | gelation | Comp. Ex. 105 | gelation |
| | 46 | Ex. 226 | +1.0 | Comp. Ex. 86 | gelation | Comp. Ex. 106 | gelation |
| | 47 | Ex. 227 | +1.1 | Comp. Ex. 87 | gelation | Comp. Ex. 107 | gelation |
| | 48 | Ex. 228 | +1.0 | Comp. Ex. 88 | gelation | Comp. Ex. 108 | gelation |

TABLE 15-2-continued

| | | Phenol aromatic compound having two hydroxyl groups in the molecule thereof | | | | |
|---|---|---|---|---|---|---|
| | | C4 | | C5 | | C6 |
| | Ex. | Rate of change (%) | Comp. Ex. | Rate of change (%) | Comp. Ex. | Rate of change (%) |
| 49 | Ex. 229 | +0.9 | Comp. Ex. 89 | gelation | Comp. Ex. 109 | gelation |
| 50 | Ex. 220 | +1.2 | Comp. Ex. 90 | gelation | Comp. Ex. 110 | gelation |
| 51 | Ex. 231 | +0.9 | Comp. Ex. 91 | gelation | Comp. Ex. 111 | gelation |
| 52 | Ex. 232 | +1.2 | Comp. Ex. 92 | gelation | Comp. Ex. 112 | gelation |
| 53 | Ex. 233 | +1.1 | Comp. Ex. 93 | gelation | Comp. Ex. 113 | gelation |
| 54 | Ex. 234 | +0.9 | Comp. Ex. 94 | gelation | Comp. Ex. 114 | gelation |
| 55 | Ex. 235 | +1.1 | Comp. Ex. 95 | gelation | Comp. Ex. 115 | gelation |
| 56 | Ex. 236 | +0.9 | Comp. Ex. 96 | gelation | Comp. Ex. 116 | gelation |
| 57 | Ex. 237 | +1.3 | Comp. Ex. 97 | gelation | Comp. Ex. 117 | gelation |
| 58 | Ex. 238 | +1.0 | Comp. Ex. 98 | gelation | Comp. Ex. 118 | gelation |
| 59 | Ex. 239 | +1.0 | Comp. Ex. 99 | gelation | Comp. Ex. 119 | gelation |
| 60 | Ex. 240 | +0.9 | Comp. Ex. 100 | gelation | Comp. Ex. 120 | gelation |

*Prep. Ex. means "Preparation Example," and the mixture prepared in each Preparation Example was used to prepare the inks of Examples and Comparative Examples described in the same row.

TABLE 16-1

| | | Phenol aromatic compound having two hydroxyl groups in the molecule thereof | | | | |
|---|---|---|---|---|---|---|
| | | C1 | | C2 | | C3 |
| | Ex. | Rate of change (%) | Ex. | Rate of change (%) | Ex. | Rate of change (%) |
| Prep. Ex.* | 61 Ex. 241 | +1.1 | Ex. 261 | +1.3 | Ex. 281 | +1.0 |
| | 62 Ex. 242 | +1.5 | Ex. 262 | +1.0 | Ex. 282 | +1.0 |
| | 63 Ex. 243 | +1.8 | Ex. 263 | +1.0 | Ex. 283 | +0.9 |
| | 64 Ex. 244 | +1.9 | Ex. 264 | +0.9 | Ex. 284 | +1.2 |
| | 65 Ex. 245 | +1.3 | Ex. 265 | +1.2 | Ex. 285 | +1.1 |
| | 66 Ex. 246 | +2.0 | Ex. 266 | +1.1 | Ex. 286 | +1.0 |
| | 67 Ex. 247 | +1.5 | Ex. 267 | +1.6 | Ex. 287 | +1.0 |
| | 68 Ex. 248 | +1.9 | Ex. 268 | +1.2 | Ex. 288 | +0.9 |
| | 69 Ex. 249 | +1.2 | Ex. 269 | +1.5 | Ex. 289 | +1.2 |
| | 70 Ex. 250 | +1.4 | Ex. 270 | +1.6 | Ex. 290 | +1.1 |
| | 71 Ex. 251 | +1.8 | Ex. 271 | +1.0 | Ex. 291 | +1.2 |
| | 72 Ex. 252 | +1.9 | Ex. 272 | +1.0 | Ex. 292 | +1.1 |
| | 73 Ex. 253 | +1.3 | Ex. 273 | +0.9 | Ex. 293 | +1.0 |
| | 74 Ex. 254 | +2.0 | Ex. 274 | +1.2 | Ex. 294 | +1.0 |
| | 75 Ex. 255 | +1.5 | Ex. 275 | +1.1 | Ex. 295 | +0.9 |
| | 76 Ex. 256 | +1.9 | Ex. 276 | +1.1 | Ex. 296 | +0.7 |
| | 77 Ex. 257 | +1.2 | Ex. 277 | +1.0 | Ex. 297 | +0.9 |
| | 78 Ex. 258 | +1.4 | Ex. 278 | +0.9 | Ex. 298 | +0.8 |
| | 79 Ex. 259 | +1.8 | Ex. 279 | +1.2 | Ex. 299 | +1.0 |
| | 80 Ex. 260 | +1.9 | Ex. 280 | +0.8 | Ex. 300 | +1.1 |

*Prep. Ex. means "Preparation Example," and the mixture prepared in each Preparation Example was used to prepare the inks of Examples described in the same row.

TABLE 16-2

| | | Phenol aromatic compound having two hydroxyl groups in the molecule thereof | | | | |
|---|---|---|---|---|---|---|
| | | C4 | | C5 | | C6 |
| | Ex. | Rate of change (%) | Comp. Ex. | Rate of change (%) | Comp. Ex. | Rate of change (%) |
| Prep. Ex.* | 61 Ex. 301 | +1.6 | Comp. Ex. 121 | gelation | Comp. Ex. 141 | gelation |
| | 62 Ex. 302 | +1.0 | Comp. Ex. 122 | gelation | Comp. Ex. 142 | gelation |
| | 63 Ex. 303 | +1.0 | Comp. Ex. 123 | gelation | Comp. Ex. 143 | gelation |
| | 64 Ex. 304 | +0.9 | Comp. Ex. 124 | gelation | Comp. Ex. 144 | gelation |
| | 65 Ex. 305 | +1.2 | Comp. Ex. 125 | gelation | Comp. Ex. 145 | gelation |
| | 66 Ex. 306 | +1.0 | Comp. Ex. 126 | gelation | Comp. Ex. 146 | gelation |
| | 67 Ex. 307 | +0.9 | Comp. Ex. 127 | gelation | Comp. Ex. 147 | gelation |
| | 68 Ex. 308 | +1.2 | Comp. Ex. 128 | gelation | Comp. Ex. 148 | gelation |
| | 69 Ex. 309 | +1.1 | Comp. Ex. 129 | gelation | Comp. Ex. 149 | gelation |
| | 70 Ex. 310 | +1.6 | Comp. Ex. 130 | gelation | Comp. Ex. 150 | gelation |
| | 71 Ex. 311 | +0.9 | Comp. Ex. 131 | gelation | Comp. Ex. 151 | gelation |
| | 72 Ex. 312 | +1.2 | Comp. Ex. 132 | gelation | Comp. Ex. 152 | gelation |
| | 73 Ex. 313 | +1.0 | Comp. Ex. 133 | gelation | Comp. Ex. 153 | gelation |
| | 74 Ex. 314 | +0.9 | Comp. Ex. 134 | gelation | Comp. Ex. 154 | gelation |
| | 75 Ex. 315 | +1.2 | Comp. Ex. 135 | gelation | Comp. Ex. 155 | gelation |
| | 76 Ex. 316 | +0.8 | Comp. Ex. 136 | gelation | Comp. Ex. 156 | gelation |
| | 77 Ex. 317 | +1.0 | Comp. Ex. 137 | gelation | Comp. Ex. 157 | gelation |
| | 78 Ex. 318 | +1.1 | Comp. Ex. 138 | gelation | Comp. Ex. 158 | gelation |
| | 79 Ex. 319 | +1.0 | Comp. Ex. 139 | gelation | Comp. Ex. 159 | gelation |
| | 80 Ex. 320 | +0.9 | Comp. Ex. 140 | gelation | Comp. Ex. 160 | gelation |

*Prep. Ex. means "Preparation Example," and the mixture prepared in each Preparation Example was used to prepare the inks of Examples and Comparative Examples described in the same row.

TABLE 17-1

| | | Phenol aromatic compound having two hydroxyl groups in the molecule thereof | | | | |
|---|---|---|---|---|---|---|
| | | C1 | | C2 | | C3 |
| | Ex. | Rate of change (%) | Ex. | Rate of change (%) | Ex. | Rate of change (%) |
| Prep. Ex.* | 81 Ex. 321 | +2.1 | Ex. 341 | +0.9 | Ex. 361 | +0.9 |
| | 82 Ex. 322 | +1.5 | Ex. 342 | +1.2 | Ex. 362 | +1.2 |
| | 83 Ex. 323 | +2.0 | Ex. 343 | +1.1 | Ex. 363 | +1.1 |
| | 84 Ex. 324 | +1.8 | Ex. 344 | +1.1 | Ex. 364 | +1.2 |
| | 85 Ex. 325 | +1.7 | Ex. 345 | +1.0 | Ex. 365 | +1.1 |
| | 86 Ex. 326 | +1.9 | Ex. 346 | +1.2 | Ex. 366 | +1.0 |
| | 87 Ex. 327 | +1.2 | Ex. 347 | +1.4 | Ex. 367 | +1.1 |
| | 88 Ex. 328 | +1.4 | Ex. 348 | +1.6 | Ex. 368 | +1.5 |
| | 89 Ex. 329 | +1.8 | Ex. 349 | +1.0 | Ex. 369 | +1.3 |
| | 90 Ex. 330 | +1.9 | Ex. 350 | +1.1 | Ex. 370 | +1.5 |
| | 91 Ex. 331 | +1.8 | Ex. 351 | +1.5 | Ex. 371 | +1.5 |
| | 92 Ex. 332 | +1.9 | Ex. 352 | +1.3 | Ex. 372 | +1.6 |
| | 93 Ex. 333 | +1.3 | Ex. 353 | +1.0 | Ex. 373 | +1.0 |
| | 94 Ex. 334 | +2.0 | Ex. 354 | +1.2 | Ex. 374 | +1.0 |

TABLE 17-1-continued

Phenol aromatic compound having two hydroxyl groups in the molecule thereof

| | | C1 | | C2 | | C3 | |
|---|---|---|---|---|---|---|---|
| | | Ex. | Rate of change (%) | Ex. | Rate of change (%) | Ex. | Rate of change (%) |
| | 95 | Ex. 335 | +1.5 | Ex. 355 | +1.4 | Ex. 375 | +0.9 |
| | 96 | Ex. 336 | +2.0 | Ex. 356 | +1.6 | Ex. 376 | +1.0 |
| | 97 | Ex. 337 | +1.8 | Ex. 357 | +1.0 | Ex. 377 | +1.2 |
| | 98 | Ex. 338 | +1.7 | Ex. 358 | +1.3 | Ex. 378 | +1.4 |
| | 99 | Ex. 339 | +1.9 | Ex. 359 | +1.0 | Ex. 379 | +1.6 |
| | 100 | Ex. 340 | +1.2 | Ex. 360 | +1.2 | Ex. 380 | +1.0 |

*Prep. Ex. means "Preparation Example," and the mixture prepared in each Preparation Example was used to prepare the inks of Examples described in the same row.

TABLE 17-2

Phenol aromatic compound having two hydroxyl groups in the molecule thereof

| | | C4 | | C5 | | C6 | |
|---|---|---|---|---|---|---|---|
| | | Ex. | Rate of change (%) | Comp. Ex. | Rate of change (%) | Comp. Ex. | Rate of change (%) |
| Prep. Ex.* | 81 | Ex. 381 | +1.2 | Comp. Ex. 161 | gelation | Comp. Ex. 181 | gelation |
| | 82 | Ex. 382 | +1.0 | Comp. Ex. 162 | gelation | Comp. Ex. 182 | gelation |
| | 83 | Ex. 383 | +0.9 | Comp. Ex. 163 | gelation | Comp. Ex. 183 | gelation |
| | 84 | Ex. 384 | +1.2 | Comp. Ex. 164 | gelation | Comp. Ex. 184 | gelation |
| | 85 | Ex. 385 | +0.8 | Comp. Ex. 165 | gelation | Comp. Ex. 185 | gelation |
| | 86 | Ex. 386 | +1.0 | Comp. Ex. 166 | gelation | Comp. Ex. 186 | gelation |
| | 87 | Ex. 387 | +0.9 | Comp. Ex. 167 | gelation | Comp. Ex. 187 | gelation |
| | 88 | Ex. 388 | +1.0 | Comp. Ex. 168 | gelation | Comp. Ex. 188 | gelation |
| | 89 | Ex. 389 | +1.2 | Comp. Ex. 169 | gelation | Comp. Ex. 189 | gelation |
| | 90 | Ex. 390 | +1.4 | Comp. Ex. 170 | gelation | Comp. Ex. 190 | gelation |
| | 91 | Ex. 391 | +1.0 | Comp. Ex. 171 | gelation | Comp. Ex. 191 | gelation |
| | 92 | Ex. 392 | +0.9 | Comp. Ex. 172 | gelation | Comp. Ex. 192 | gelation |
| | 93 | Ex. 393 | +1.2 | Comp. Ex. 173 | gelation | Comp. Ex. 193 | gelation |
| | 94 | Ex. 394 | +0.8 | Comp. Ex. 174 | gelation | Comp. Ex. 194 | gelation |
| | 95 | Ex. 395 | +1.0 | Comp. Ex. 175 | gelation | Comp. Ex. 195 | gelation |
| | 96 | Ex. 396 | +1.1 | Comp. Ex. 176 | gelation | Comp. Ex. 196 | gelation |
| | 97 | Ex. 397 | +1.5 | Comp. Ex. 177 | gelation | Comp. Ex. 197 | gelation |
| | 98 | Ex. 398 | +1.3 | Comp. Ex. 178 | gelation | Comp. Ex. 198 | gelation |
| | 99 | Ex. 399 | +1.0 | Comp. Ex. 179 | gelation | Comp. Ex. 199 | gelation |
| | 100 | Ex. 400 | +1.2 | Comp. Ex. 180 | gelation | Comp. Ex. 200 | gelation |

*Prep. Ex. means "Preparation Example," and the mixture prepared in each Preparation Example was used to prepare the inks of Examples and Comparative Examples described in the same row.

TABLE 18-1

Phenol aromatic compound having two hydroxyl groups in the molecule thereof

| | | C1 | | C2 | | C3 | |
|---|---|---|---|---|---|---|---|
| | | Ex. | Rate of change (%) | Ex. | Rate of change (%) | Ex. | Rate of change (%) |
| Prep. Ex.* | 101 | Ex. 401 | +2.0 | Ex. 421 | +1.0 | Ex. 441 | +0.8 |
| | 102 | Ex. 402 | +1.2 | Ex. 422 | +1.2 | Ex. 442 | +1.0 |
| | 103 | Ex. 403 | +2.1 | Ex. 423 | +1.4 | Ex. 443 | +0.9 |
| | 104 | Ex. 404 | +2.1 | Ex. 424 | +1.6 | Ex. 444 | +1.0 |
| | 105 | Ex. 405 | +1.8 | Ex. 425 | +1.0 | Ex. 445 | +1.2 |
| | 106 | Ex. 406 | +2.0 | Ex. 426 | +0.9 | Ex. 446 | +1.0 |
| | 107 | Ex. 407 | +1.8 | Ex. 427 | +1.2 | Ex. 447 | +0.9 |
| | 108 | Ex. 408 | +1.7 | Ex. 428 | +1.1 | Ex. 448 | +1.2 |
| | 109 | Ex. 409 | +1.9 | Ex. 429 | +1.1 | Ex. 449 | +1.1 |
| | 110 | Ex. 410 | +1.2 | Ex. 430 | +1.0 | Ex. 450 | +1.1 |
| | 111 | Ex. 411 | +2.1 | Ex. 431 | +1.1 | Ex. 451 | +1.1 |
| | 112 | Ex. 412 | +1.5 | Ex. 432 | +1.2 | Ex. 452 | +1.5 |
| | 113 | Ex. 413 | +2.0 | Ex. 433 | +1.1 | Ex. 453 | +1.3 |
| | 114 | Ex. 414 | +1.8 | Ex. 434 | +1.0 | Ex. 454 | +1.0 |
| | 115 | Ex. 415 | +1.7 | Ex. 435 | +1.1 | Ex. 455 | +1.2 |
| | 116 | Ex. 416 | +2.0 | Ex. 436 | +1.1 | Ex. 456 | +1.1 |
| | 117 | Ex. 417 | +1.8 | Ex. 437 | +1.0 | Ex. 457 | +1.1 |
| | 118 | Ex. 418 | +1.7 | Ex. 438 | +1.1 | Ex. 458 | +1.1 |
| | 119 | Ex. 419 | +1.9 | Ex. 439 | +1.2 | Ex. 459 | +1.5 |
| | 120 | Ex. 420 | +1.2 | Ex. 440 | +1.1 | Ex. 460 | +1.3 |

*Prep. Ex. means "Preparation Example," and the mixture prepared in each Preparation Example was used to prepare the inks of Examples described in the same row.

TABLE 18-2

Phenol aromatic compound having two hydroxyl groups in the molecule thereof

| | | C4 | | C5 | | C6 | |
|---|---|---|---|---|---|---|---|
| | | Ex. | Rate of change (%) | Comp. Ex. | Rate of change (%) | Comp. Ex. | Rate of change (%) |
| Prep. Ex.* | 101 | Ex. 461 | +1.0 | Comp. Ex. 201 | gelation | Comp. Ex. 221 | gelation |
| | 102 | Ex. 462 | +1.1 | Comp. Ex. 202 | gelation | Comp. Ex. 222 | gelation |
| | 103 | Ex. 463 | +1.2 | Comp. Ex. 203 | gelation | Comp. Ex. 223 | gelation |
| | 104 | Ex. 464 | +1.1 | Comp. Ex. 204 | gelation | Comp. Ex. 224 | gelation |
| | 105 | Ex. 465 | +1.0 | Comp. Ex. 205 | gelation | Comp. Ex. 225 | gelation |
| | 106 | Ex. 466 | +1.0 | Comp. Ex. 206 | gelation | Comp. Ex. 226 | gelation |
| | 107 | Ex. 467 | +1.2 | Comp. Ex. 207 | gelation | Comp. Ex. 227 | gelation |
| | 108 | Ex. 468 | +1.0 | Comp. Ex. 208 | gelation | Comp. Ex. 228 | gelation |
| | 109 | Ex. 469 | +0.9 | Comp. Ex. 209 | gelation | Comp. Ex. 229 | gelation |
| | 110 | Ex. 470 | +1.2 | Comp. Ex. 210 | gelation | Comp. Ex. 230 | gelation |
| | 111 | Ex. 471 | +1.2 | Comp. Ex. 211 | gelation | Comp. Ex. 231 | gelation |
| | 112 | Ex. 472 | +1.1 | Comp. Ex. 212 | gelation | Comp. Ex. 232 | gelation |
| | 113 | Ex. 473 | +1.5 | Comp. Ex. 213 | gelation | Comp. Ex. 233 | gelation |
| | 114 | Ex. 474 | +1.3 | Comp. Ex. 214 | gelation | Comp. Ex. 234 | gelation |
| | 115 | Ex. 475 | +1.0 | Comp. Ex. 215 | gelation | Comp. Ex. 235 | gelation |
| | 116 | Ex. 476 | +1.2 | Comp. Ex. 216 | gelation | Comp. Ex. 236 | gelation |
| | 117 | Ex. 477 | +1.1 | Comp. Ex. 217 | gelation | Comp. Ex. 237 | gelation |

TABLE 18-2-continued

| | | Phenol aromatic compound having two hydroxyl groups in the molecule thereof | | | | |
|---|---|---|---|---|---|---|
| | | C4 | | C5 | | C6 |
| | Ex. | Rate of change (%) | Comp. Ex. | Rate of change (%) | Comp. Ex. | Rate of change (%) |
| 118 | Ex. 478 | +0.9 | Comp. Ex. 218 | gelation | Comp. Ex. 238 | gelation |
| 119 | Ex. 479 | +1.2 | Comp. Ex. 219 | gelation | Comp. Ex. 239 | gelation |
| 120 | Ex. 480 | +1.2 | Comp. Ex. 220 | gelation | Comp. Ex. 240 | gelation |

*Prep. Ex. means "Preparation Example," and the mixture prepared in each Preparation Example was used to prepare the inks of Examples and Comparative Examples described in the same row.

The inks containing the mixtures of Preparation Examples 1 to 40, each containing the self-cleaving photopolymerization initiator only as the photopolymerization initiator, together with the phenol aromatic compound having two hydroxyl groups in the molecule thereof (any one of C1 to C4) were found to exhibit good storage stability (Examples 1 to 160).

The inks containing the mixtures of Preparation Examples 1 to 40, each containing the self-cleaving photopolymerization initiator only as the photopolymerization initiator, together with the phenol aromatic compound having only one hydroxyl group in the molecule thereof (C5 or C6) were found to gelate; i.e., not to exhibit sufficient storage stability (Comparative Examples 1 to 80).

As described above, the present inventor previously found a photopolymerizable inkjet ink which is negative for skin sensitization, improves the coated film in curing property, enables possible curing failures in the coated film to be visually confirmed, and facilitates quality control in the production process. Specifically, the photopolymerizable inkjet ink contains: one or more types of photopolymerizable monomers each having a SI value of less than 3; a self-cleaving photopolymerization initiator; a hydrogen-abstracting polymerization initiator; and an amine compound serving as a polymerization accelerator. When the mixtures of Preparation Examples 41 to 120 each containing, as in the above-described ink, the self-cleaving photopolymerization initiator, the hydrogen-abstracting polymerization initiator, and the amine compound serving as a polymerization accelerator as photopolymerization initiators were mixed with the phenol aromatic compound having two hydroxyl groups in the molecule thereof (any one of C1 to C4), the obtained inks were found to exhibit good storage stability similar to the mixtures of Preparation Examples 1 to 40 each containing the self-cleaving photopolymerization initiator only as the photopolymerization initiator (Examples 161 to 480). However, when they were mixed with the phenol aromatic compound having only one hydroxyl group in the molecule thereof (C5 or C6), all of the obtained inks were found to gelate; i.e., not to exhibit sufficient storage stability (Comparative Examples 81 to 240).

Example 481

An ink of Example 481 was produced in the same manner as in Example 60, except that the amount of the phenol aromatic compound having two hydroxyl groups in the molecule thereof C3 was changed from 0.1 parts by mass from 0.01 parts by mass per 100 parts by mass of the mixture of Preparation Example 20.

The thus-produced ink was measured for rate of change in viscosity at 60° C. in the same manner as described above. The rate of change of the ink was +2.2%, indicating good storage stability.

Example 482

An ink of Example 482 was produced by adding 0.1 parts by mass of phenol aromatic compound having two hydroxyl groups in the molecule thereof C7 [2,2'-methylenebis(4-methyl-6-tert-butylphenol) (NONFLEX MBP, product of Seiko Chemical Co., Ltd.)] to 100 parts by mass of the mixture of Preparation Example 20.

The thus-produced ink was measured for rate of change in viscosity at 60° C. in the same manner as described above. The rate of change of the ink was +3.0%, indicating good storage stability.

Example 483

An ink of Example 483 was produced by adding 0.1 parts by mass of phenol aromatic compound having two hydroxyl groups in the molecule thereof C8 [2,2'-methylenebis(4-ethyl-6-tert-butylphenol) (NONFLEX MBP, product of Seiko Chemical Co., Ltd.)] to 100 parts by mass of the mixture of Preparation Example 20.

The thus-produced ink was measured for rate of change in viscosity at 60° C. in the same manner as described above. The rate of change of the ink was +3.2%, indicating good storage stability.

Example 484

An ink of Example 484 was produced by adding 0.1 parts by mass of phenol aromatic compound having two hydroxyl groups in the molecule thereof C9 [2,2'-methylenebis[6-(1-methylcyclohexyl-p-cresol) (NONFLEX MBP, product of Seiko Chemical Co., Ltd.)] to 100 parts by mass of the mixture of Preparation Example 20.

The thus-produced ink was measured for rate of change in viscosity at 60° C. in the same manner as described above. The rate of change of the ink was +2.9%, indicating good storage stability.

Preparation Example 121

A mixture of Preparation Example 121 was prepared in the same manner as in Preparation Example 20, except that 40 parts by mass of A20 and 10 parts by mass of A24 [diethyleneglycol diacrylate (SR230, product of Sartomer Co.)] were added instead of 50 parts by mass of A20.

Example 485

An ink of Example 485 was produced by adding 0.1 parts by mass of the phenol aromatic compound having two hydroxyl groups in the molecule thereof C1 to 100 parts by mass of the mixture of Preparation Example 121.

The thus-produced ink was measured for rate of change in viscosity at 60° C. in the same manner as described above. The rate of change of the ink was +1.9%, indicating good storage stability.

Preparation Example 122

A mixture of Preparation Example 122 was prepared in the same manner as in Preparation Example 20, except that 40 parts by mass of A20 and 10 parts by mass of A25 [trimethylolpropane triacrylate (M-309, product of Toagosei Chemical CO., LTD.)] instead of 50 parts by mass of A20.

Example 486

An ink of Example 486 was produced by adding 0.1 parts by mass of the phenol aromatic compound having two hydroxyl groups in the molecule thereof C1 to 100 parts by mass of the mixture of Preparation Example 122.

The thus-produced ink was measured for rate of change in viscosity at 60° C. in the same manner as described above. The rate of change of the ink was +2.1%, indicating good storage stability.

Aspects of the present invention are as follows.
<1> A photopolymerizable inkjet ink including:
a photopolymerizable monomer having a Stimulation Index of less than 3, where the Stimulation Index indicates the extent of sensitization as measured by a skin sensitization test based on Local Lymph Node Assay; and
a phenol aromatic compound having two hydroxyl groups in the molecule thereof.
<2> The photopolymerizable inkjet ink according to <1>, wherein the phenol aromatic compound having two hydroxyl groups in the molecule thereof is at least one selected from the group consisting of hydroquinone, methylhydroquinone, tert-butylhydroquinone and 2,5-di-tert-butylhydroquinone.
<3> The photopolymerizable inkjet ink according to <1> or <2>, further including: at least one selected from the group consisting of a self-cleaving photopolymerization initiator, a hydrogen-abstracting photopolymerization initiator, and an amine compound serving as a polymerization accelerator.
<4> The photopolymerizable inkjet ink according to <3>, wherein the hydrogen-abstracting photopolymerization initiator is a thioxanthone compound.
<5> The photopolymerizable inkjet ink according to <3> or <4>, wherein the amine compound is a benzoic acid ester compound containing a N,N-dimethylamino group.
<6> The photopolymerizable inkjet ink according to any one of <1> to <5>, wherein the photopolymerizable monomer is at least one selected from the group consisting of polyethylene glycol dimethacrylates represented by the following General Formula (1), γ-butyrolactone methacrylate, trimethylolpropane trimethacrylate, tricyclodecanedimethanol dimethacrylate, caprolactone-modified dipentaerythritol hexaacrylate, polypropylene glycol diacrylate [$CH_2=CH-CO-(OC_3H_6)_n-OCOCH=CH_2$ (n is nearly equal to 12)], diacrylates of caprolactone-modified neopentylglycol hydroxypivalate, polyethoxylated tetramethylol methane tetraacrylate, ethylene oxide-modified bisphenol A diacrylate, neopentyl glycol dimethacrylate, stearyl acrylate, 1,4-butanediol dimethacrylate, hydroxyethyl acrylamide, t-butyl methacrylate, n-pentyl methacrylate, n-hexyl methacrylate, ethylene oxide-modified phenol acrylate, isostearyl acrylate, ethylene oxide-modified trimethylolpropane trimethacrylate, stearyl methacrylate, glycerin dimethacrylate:

General Formula (1)

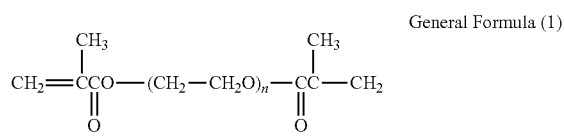

where n is nearly equal to 2, 9 or 14.

<7> An ink cartridge including:
the photopolymerizable inkjet ink according to any one of <1> to <6>; and
a container, which houses the photopolymerizable inkjet ink.
<8> A printer including:
the photopolymerizable inkjet ink according to any one of <1> to <6>, or the ink cartridge according to <7>, or both thereof.

The present invention can provide: a photopolymerizable inkjet ink safe in skin sensitization and good in storage stability at high temperatures; an ink cartridge housing the ink; and a printer containing the ink cartridge mounted thereto.

Also in the photopolymerizable inkjet ink, curing failures can easily be determined visually, not requiring dangerous actions such as inserting fingers into printers in operation nor providing printers with expensive detectors.

Furthermore, printed products obtained by using the ink of the present invention are safe in skin sensitization even if uncured monomers remain. The printed products do not sensitize the skin of, for example, fingers and hands which have been brought into contact therewith. Thus, the ink of the present invention can provide safe printed products.

REFERENCE SIGNS LIST

1: Base material feed roller
2: Base material to be printed
3: Printing unit
3a: Printing unit for a color ink
3b: Printing unit for a color ink
3c: Printing unit for a color ink
3d: Printing unit for a color ink
4a: UV light source
4b: UV light source
4c: UV light source
4d: UV light source
5: Processing unit
6: Wind-up roll for printed products
200: Ink cartridge
241: Ink bag
242: Ink inlet
243: Ink outlet
244: Cartridge case

The invention claimed is:
1. A photopolymerizable inkjet ink comprising: at least one photopolymerizable monomer having a Stimulation Index of less than 3; and at least one phenol aromatic compound having two hydroxyl groups in a molecule thereof, wherein the ink contains 0.001 parts by mass to 1 part by mass of the phenol aromatic compound per 100 parts by mass of the photopolymerizable monomer, and wherein the Stimulation Index indicates an extent of sensitization measured by a skin sensitization test based on Local Lymph Node Assay.

2. The photopolymerizable inkjet ink according to claim 1, wherein the phenol aromatic compound is at least one selected from the group consisting of hydroquinone, methylhydroquinone, tert-butylhydroquinone and 2,5-di-tert-butylhydroquinone.

3. The photopolymerizable inkjet ink according to claim 1, further comprising:
at least one selected from the group consisting of a self-cleaving photopolymerization initiator, a hydrogen-abstracting photopolymerization initiator, and an amine compound serving as a polymerization accelerator.

4. The photopolymerizable inkjet ink according to claim 3, which comprises the hydrogen-abstracting photopolymerization initiator and wherein the hydrogen-abstracting photopolymerization initiator is a thioxanthone compound.

5. The photopolymerizable inkjet ink according to claim 3, which comprises the amine compound and wherein the amine compound is a benzoic acid ester compound comprising a N,N-dimethylamino group.

6. The photopolymerizable inkjet ink according to claim 3, wherein the total amount of the photopolymerization initiators and the polymerization accelerator is 1 part by mass to 50 parts by mass per 100 parts by mass of the photopolymerizable monomer.

7. The photopolymerizable inkjet ink according to claim 1, wherein said at least one photopolymerizable monomer is the sole monomer in the inkjet ink.

8. The photopolymerizable inkjet ink according to claim 1, which causes no skin sensitization.

9. The photopolymerizable inkjet ink according to claim 1, wherein the photopolymerizable monomer has a Stimulation Index of less than 2.

10. The photopolymerizable inkjet ink according to claim 1, wherein the photopolymerizable monomer has a Stimulation Index of less than 1.6.

11. The photopolymerizable inkjet ink according to claim 1, wherein the total amount of the photopolymerization initiators and the polymerization accelerator is 10 parts by mass to 35 parts by mass per 100 parts by mass of the photopolymerizable monomer.

12. The photopolymerizable inkjet ink according to claim 11, wherein the hydrogen-abstracting photopolymerization initiator is a thioxanthone compound.

13. The photopolymerizable inkjet ink according to claim 11, wherein the amine compound is a benzoic acid ester compound comprising a N,N-dimethylamino group.

14. The photopolymerizable inkjet ink according to claim 11, wherein the phenol aromatic compound is at least one selected from the group consisting of hydroquinone, methylhydroquinone, tert-butylhydroquinone, and 2,5-di-tert-butylhydroquinone.

15. The photopolymerizable inkjet ink according to claim 11, which causes no skin sensitization.

16. The photopolymerizable inkjet ink according to claim 1, which further comprises a self-cleaving photopolymerization initiator, a hydrogen-abstracting photopolymerization initiator, and an amine compound serving as a polymerization accelerator.

17. An ink cartridge, comprising:
a photopolymerizable inkjet ink; and
a container, which houses the photopolymerizable inkjet ink,
wherein the photopolymerizable inkjet ink comprises:
at least one photopolymerizable monomer having a Stimulation Index of less than 3; and
at least one phenol aromatic compound having two hydroxyl groups in a molecule thereof,
wherein the Stimulation Index indicates an extent of sensitization measured by a skin sensitization test based on Local Lymph Node Assay.

18. A printer, comprising:
an ink cartridge,
wherein the ink cartridge comprises:
photopolymerizable inkjet ink; and
a container, which houses the photopolymerizable inkjet ink,
wherein the photopolymerizable inkjet ink comprises:
at least one photopolymerizable monomer having a Stimulation Index of less than 3; and
at least one phenol aromatic compound having two hydroxyl group in a molecule thereof,
wherein the Stimulation Index indicates an extent of sensitization measured by a skin sensitization test based on Local Lymph Node Assay.

* * * * *